US012639128B1

(12) United States Patent　　　　　　(10) Patent No.:　US 12,639,128 B1
Shekhar et al.　　　　　　　　　　　　(45) Date of Patent:　May 26, 2026

(54) ADAPTIVE THROTTLING BASED ON RATE-LIMITING SIGNALS FROM CLOUD INFRASTRUCTURE

(71) Applicant: Cohesity, Inc., San Jose, CA (US)

(72) Inventors: Sisir Shekhar, Bengaluru (IN); Anubhav Gupta, San Jose, CA (US); Venkata Ranga Guturi, San Jose, CA (US); Anirudh Kumar, San Jose, CA (US)

(73) Assignee: Cohesity, Inc., Santa Clara, CA (US)

( * ) Notice: Subject to any disclaimer, the term of this patent is extended or adjusted under 35 U.S.C. 154(b) by 70 days.

(21) Appl. No.: 18/651,330

(22) Filed: Apr. 30, 2024

(51) Int. Cl.
　　*G06F 15/173*　　　(2006.01)
　　*G06F 9/50*　　　　(2006.01)
　　*G06F 9/54*　　　　(2006.01)
(52) U.S. Cl.
　　CPC ............ *G06F 9/505* (2013.01); *G06F 9/5038* (2013.01); *G06F 9/5077* (2013.01); *G06F 9/542* (2013.01)
(58) Field of Classification Search
　　CPC ...... G06F 9/505; G06F 9/5038; G06F 9/5077; G06F 9/542
　　See application file for complete search history.

(56) References Cited

U.S. PATENT DOCUMENTS

2021/0377179 A1* 12/2021 Potu .................... H04L 47/2416
2024/0095127 A1*　3/2024 Kumar .................... G06F 9/547

OTHER PUBLICATIONS

Juvonen et al., "Avoid getting throttled or blocked in SharePoint Online", Microsoft Learn, Jul. 26, 2024, 12 pp., URL: https://learn. microsoft.com/en-us/sharepoint/dev/general-development/how-to-avoid-getting-throttled-or-blocked-in-sharepoint-online#common-throttling-scenarios-in-sharepoint-online.

* cited by examiner

*Primary Examiner* — John B Walsh
(74) *Attorney, Agent, or Firm* — Shumaker & Sieffert, P.A.

(57) ABSTRACT

Techniques are disclosed for adaptive throttling based on rate-limiting signals from cloud infrastructure. An example method comprises receiving, by a data platform implemented by a plurality of nodes, a service identifier from a cloud infrastructure system, receiving, by a first node of the plurality of nodes, a rate-limiting signal from the cloud infrastructure system, updating, by the data platform, context information associated with the service identifier based on the rate-limiting signal, sending, by a second node of the plurality of nodes and based on the service identifier, a request for the cloud infrastructure system to the first node, and throttling, by the first node, the request for the cloud infrastructure system based on the context information at least for a delay period.

20 Claims, 6 Drawing Sheets

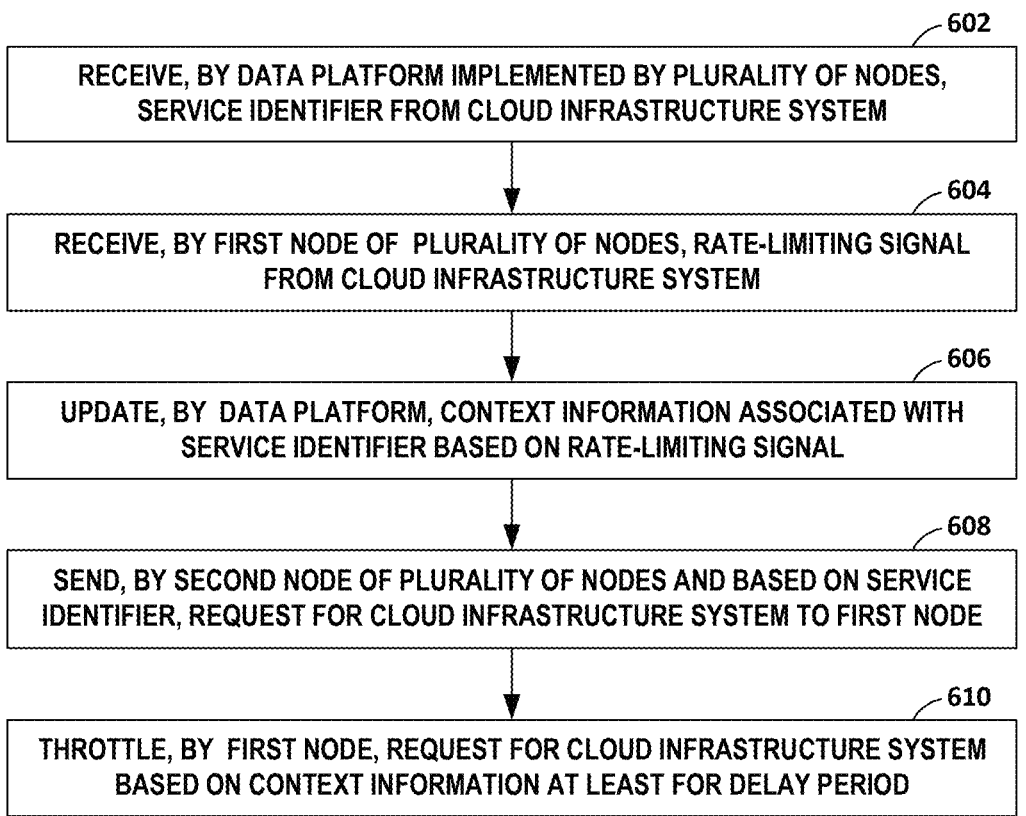

602

RECEIVE, BY DATA PLATFORM IMPLEMENTED BY PLURALITY OF NODES, SERVICE IDENTIFIER FROM CLOUD INFRASTRUCTURE SYSTEM

604

RECEIVE, BY FIRST NODE OF PLURALITY OF NODES, RATE-LIMITING SIGNAL FROM CLOUD INFRASTRUCTURE SYSTEM

606

UPDATE, BY DATA PLATFORM, CONTEXT INFORMATION ASSOCIATED WITH SERVICE IDENTIFIER BASED ON RATE-LIMITING SIGNAL

608

SEND, BY SECOND NODE OF PLURALITY OF NODES AND BASED ON SERVICE IDENTIFIER, REQUEST FOR CLOUD INFRASTRUCTURE SYSTEM TO FIRST NODE

610

THROTTLE, BY FIRST NODE, REQUEST FOR CLOUD INFRASTRUCTURE SYSTEM BASED ON CONTEXT INFORMATION AT LEAST FOR DELAY PERIOD

FIG. 6

ADAPTIVE THROTTLING BASED ON RATE-LIMITING SIGNALS FROM CLOUD INFRASTRUCTURE

TECHNICAL FIELD

This disclosure relates to data platforms for computing systems.

BACKGROUND

Data platforms that support computing applications rely on primary storage systems to support latency sensitive applications. However, because primary storage is often more difficult or expensive to scale, a secondary storage system is often relied upon to support secondary use cases such as backup and archive.

SUMMARY

Aspects of this disclosure describe techniques for adaptive throttling based on rate-limiting signals from cloud infrastructure. Cloud infrastructure provide service identifiers to tenants that use the service identifiers to access cloud services provided by the cloud infrastructure. A service identifier may identify an authenticated tenant or principal making application programming interface (API) calls. For example, MICROSOFT 365® and OFFICE 365® from MICROSOFT® Corporation and other cloud infrastructure services distribute service identifiers to clients (e.g., distributing an "AppID" in MICROSOFT® Corporation infrastructure) to include in and authenticate API calls.

A data platform may make API calls from various processes on different subsystems (e.g., computing nodes) of the data platform. In some examples, the data platform may make numerous API calls (e.g., 800 API calls per node) concurrently or in rapid succession (e.g., within milliseconds). The cloud infrastructure may transmit rate-limiting signals in response to an API call, such as to indicate an overload condition (e.g., an API call limit has been or is about to be exceeded). While the particular process or node that made the API call may receive the rate-limiting signal, the rate-limiting signal may not be received at other processes or nodes for some time (e.g., until these processes or nodes make an API call). When API calls exceed an internal limit (e.g., API calls per second or number of API calls) set by the cloud infrastructure, the cloud infrastructure may begin to throttle responses, resulting in service disruptions for the tenant and downstream users.

The techniques described herein provide adaptive throttling based on rate-limiting signals from cloud infrastructure. Rather than allowing processes or nodes to respond to rate-limiting signals on an uncoordinated individual basis, the techniques described herein may orchestrate a coordinated response across various elements (e.g., processes or nodes) of the data platform. For example, the described techniques may provide a throttling infrastructure that coordinates and monitors API calls in connection with service identifiers to respond to cloud infrastructure rate-limiting signals across processes/nodes of the data platform.

Various aspects of the techniques may enable the data platform to monitor the cloud infrastructure for rate-limiting signals and adjust (e.g., throttle) a rate of API calls made to the cloud infrastructure across the various elements of the data platform in response to the rate-limiting signals. For example, the data platform may determine whether to send an API call or delay the API call at multiple processes on multiple nodes based on the receipt of one rate-limiting signal.

The described techniques may provide one or more technical advantages that realize a practical application. For example, the described techniques improve performance of cloud infrastructure by responding to rate-limiting signals to maintain a rate of resource consumption (e.g., below 80%) which avoids an overload condition and throttling (e.g., reduced performance) at the cloud infrastructure. The disclosed techniques improve a data platform's response to rate-limiting signals by coordinating the response to rate-limiting signals across the various elements of the data platform.

Although some techniques described in this disclosure are described with respect to a backup function of a data platform, similar techniques may be applied for archive, snapshot, other data protection function, or other similar function of the data platform.

In one example, this disclosure describes a method comprising receiving, by a data platform implemented by a plurality of nodes, a service identifier from a cloud infrastructure system, receiving, by a first node of the plurality of nodes, a rate-limiting signal from the cloud infrastructure system, updating, by the data platform, context information associated with the service identifier based on the rate-limiting signal, sending, by a second node of the plurality of nodes and based on the service identifier, a request for the cloud infrastructure system to the first node, and throttling, by the first node, the request for the cloud infrastructure system based on the context information at least for a delay period.

In another example, this disclosure describes a computing system comprising a memory storing instructions and processing circuitry that executes the instructions to receive, by a data platform implemented by a plurality of nodes, a service identifier from a cloud infrastructure system, receive, by a first node of the plurality of nodes, a rate-limiting signal from the cloud infrastructure system, update, by the data platform, context information associated with the service identifier based on the rate-limiting signal, send, by a second node of the plurality of nodes and based on the service identifier, a request for the cloud infrastructure system to the first node, and throttle, by the first node, the request for the cloud infrastructure system based on the context information at least for a delay period.

In another example, this disclosure describes a method comprising receiving, by the data platform, a rate-limiting signal from the cloud infrastructure system, updating, by the data platform, context information associated with the service identifier based on the rate-limiting signal, determining, by the data platform and based on the context information, whether to send a request for the cloud infrastructure system or to refrain from sending the request for the cloud infrastructure system, determining, by the data platform, a delay period based on the context information, and refraining, by the data platform, from sending the request for the cloud infrastructure system at least for the delay period.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 6 is a flowchart illustrating an example mode of operation for a data platform to perform adaptive throttling based on rate-limiting signals from cloud infrastructure, in accordance with techniques of this disclosure.

Like reference characters denote like elements throughout the text and figures.

DETAILED DESCRIPTION

Figure 1A:
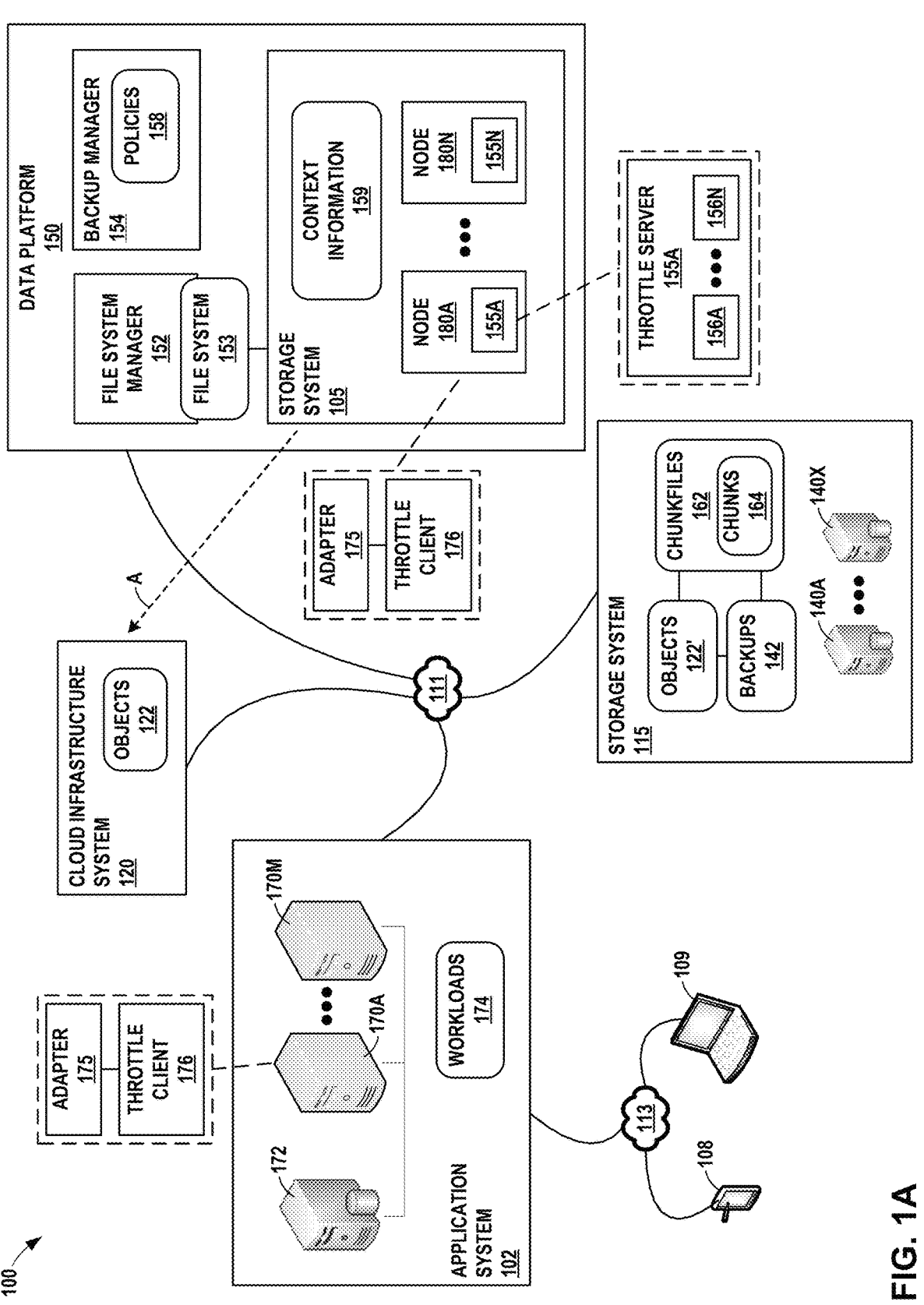
FIGS. 1A-1B are block diagrams illustrating example systems that perform adaptive throttling based on rate-limiting signals from cloud infrastructure, in accordance with techniques of this disclosure.
Figure 1B:
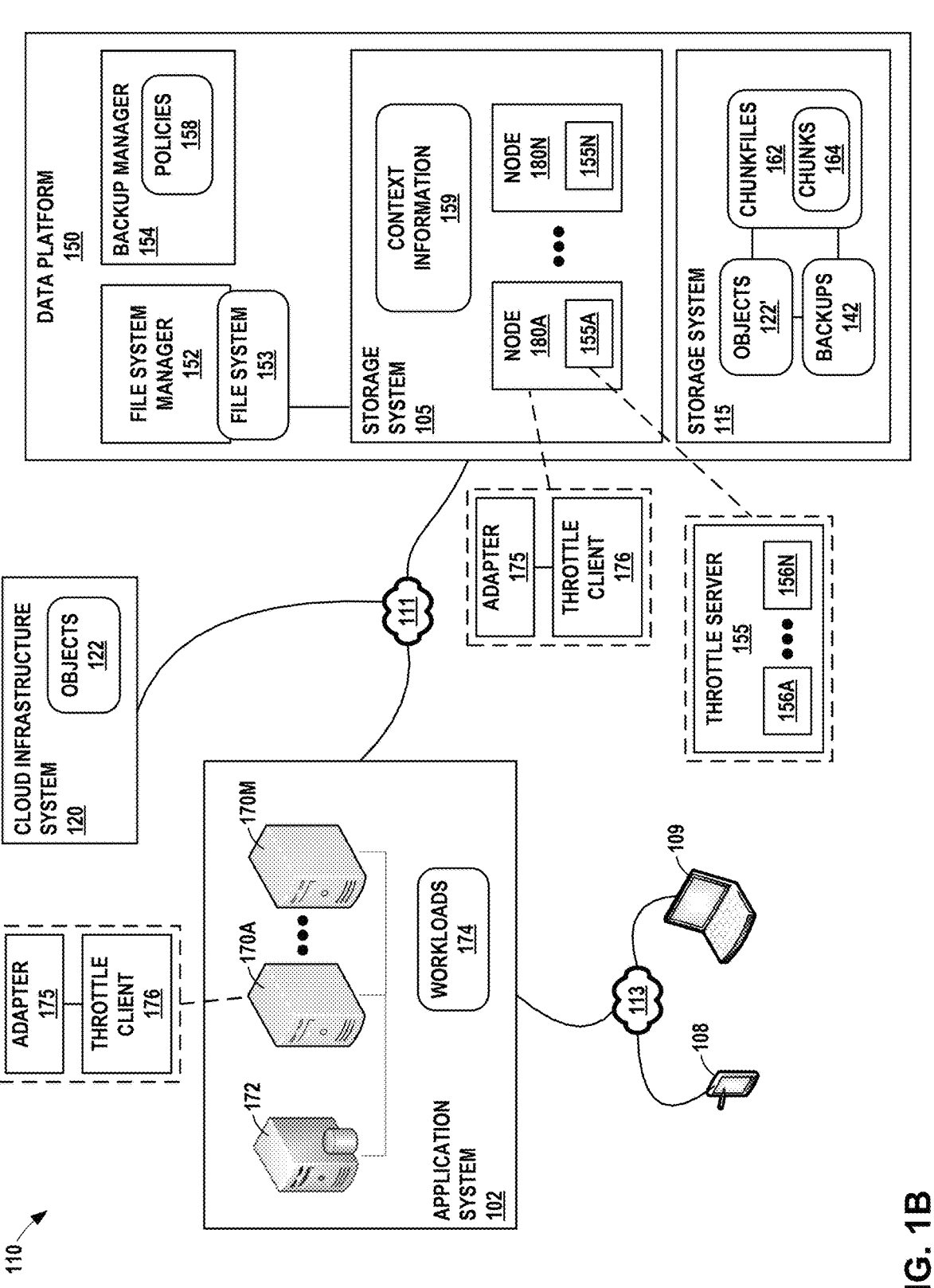

FIGS. 1A-1B are block diagrams illustrating example systems that perform adaptive throttling based on rate-limiting signals from cloud infrastructure, in accordance with one or more aspects of the present disclosure. In the example of FIG. 1A, system 100 includes application system 102. Application system 102 represents a collection of hardware devices, software components, and/or data stores that can be used to implement one or more applications or services provided to one or more mobile devices 108 and one or more user devices 109 via a network 113. Application system 102 may include one or more physical or virtual computing devices that execute workloads 174 for the applications or services. Workloads 174 may include one or more virtual machines, containers, Kubernetes pods each including one or more containers, bare metal processes, and/or other types of workloads.

In the example of FIG. 1A, application system 102 includes application servers 170A-170M (collectively, "application servers 170") connected via a network with database server 172 implementing a database. Other examples of application system 102 may include one or more load balancers, web servers, network devices such as switches or gateways, or other devices for implementing and delivering one or more applications or services to mobile devices 108 and user devices 109. Application system 102 may include one or more file servers. The one or more file servers may implement a primary file system for application system 102. (In such instances, file system 153 may be a secondary file system that provides backup, archive, and/or other services for the primary file system. Reference herein to a file system may include a primary file system or secondary file system, e.g., a primary file system for application system 102 or file system 153 operating as either a primary file system or a secondary file system.)

Application system 102 may be located on premises and/or in one or more data centers, with each data center a part of a public, private, or hybrid cloud. The applications or services may be distributed applications. The applications or services may support enterprise software, financial software, office or other productivity software, data analysis software, customer relationship management, web services, educational software, database software, multimedia software, information technology, health care software, or other type of applications or services. The applications or services may be provided as a service (-aaS) for Software-aaS (SaaS), Platform-aaS (PaaS), Infrastructure-aaS (IaaS), Data Storage-aas (dSaaS), or other type of service.

In some examples, application system 102 may represent an enterprise system that includes one or more workstations in the form of desktop computers, laptop computers, mobile devices, enterprise servers, network devices, and other hardware to support enterprise applications. Enterprise applications may include enterprise software, financial software, office or other productivity software, data analysis software, customer relationship management, web services, educational software, database software, multimedia software, information technology, health care software, or other type of applications. Enterprise applications may be delivered as a service from external cloud service providers or other providers, executed natively on application system 102, or both.

In the example of FIG. 1A, system 100 includes a data platform 150 that provides a file system 153 and backup functions to an application system 102, using storage system 105 and separate storage system 115. Data platform 150 implements a distributed file system 153 and a storage architecture to facilitate access by application system 102 to file system data and to facilitate the transfer of data between storage system 105 and application system 102 via network 111. With the distributed file system, data platform 150 enables devices of application system 102 to access file system data, via network 111 using a communication protocol, as if such file system data was stored locally (e.g., to a hard disk of a device of application system 102). Example communication protocols for accessing files and objects include Server Message Block (SMB), Network File System (NFS), or AMAZON Simple Storage Service (S3). File system 153 may be a primary file system or secondary file system for application system 102.

File system manager 152 represents a collection of hardware devices and software components that implements file system 153 for data platform 150. Examples of file system functions provided by the file system manager 152 include storage space management including deduplication, file naming, directory management, metadata management, partitioning, and access control. File system manager 152 executes a communication protocol to facilitate access via network 111 by application system 102 to files and objects stored to storage system 105.

Data platform 150 includes storage system 105 having one or more storage devices 180A-180N (collectively, "storage devices 180"). Storage devices 180 may represent one or more physical or virtual compute and/or storage devices that include or otherwise have access to storage media. Such storage media may include one or more of Flash drives, solid state drives (SSDs), hard disk drives (HDDs), forms of electrically programmable memories (EPROM) or electrically erasable and programmable (EEPROM) memories, and/or other types of storage media used to support data platform 150. Different storage devices of storage devices 180 may have a different mix of types of storage media. Each of storage devices 180 may include system memory. Each of storage devices 180 may be a storage server, a network-attached storage (NAS) device, or may represent disk storage for a compute device. Storage system 105 may be a redundant array of independent disks (RAID) system. In some examples, one or more of storage devices 180 are both compute and storage devices that execute software for data platform 150, such as file system manager 152 and backup manager 154 in the example of system 100, and store objects and metadata for data platform 150 to storage media. In some examples, separate compute devices (not shown) execute software for data platform 150, such as file system manager 152 and backup manager 154 in the example of system 100. Each of storage devices 180 may be considered and referred to as a "storage node 180" or simply as a "node 180." Storage devices 180 may represent virtual machines running on a supported hypervisor, a cloud virtual machine, a physical rack server, or a compute model installed in a converged platform.

In various examples, data platform 150 runs on physical systems, virtually, or natively in the cloud. For instance, data platform 150 may be deployed as a physical cluster, a virtual cluster, or a cloud-based cluster running in a private, hybrid private/public, or public cloud deployed by a cloud service provider. In some examples of system 100, multiple instances of data platform 150 may be deployed, and file system 153 may be replicated among the various instances. In some cases, data platform 150 is a compute cluster that represents a single management domain. The number of storage devices 180 may be scaled to meet performance needs.

Data platform 150 may implement and offer multiple storage domains to one or more tenants or to segregate workloads 174 that require different data policies. A storage domain is a data policy domain that determines policies for deduplication, compression, encryption, tiering, and other operations performed with respect to objects stored using the storage domain. In this way, data platform 150 may offer users the flexibility to choose global data policies or workload specific data policies. Data platform 150 may support partitioning.

A view is a protocol export that resides within a storage domain. A view inherits data policies from its storage domain, though additional data policies may be specified for the view. Views can be exported via SMB, NFS, S3, and/or another communication protocol. Policies that determine data processing and storage by data platform 150 may be assigned at the view level. A protection policy may specify a backup frequency and a retention policy, which may include a data lock period. Backups 142, archives, or snapshots created in accordance with a protection policy inherit the data lock period and retention period specified by the protection policy.

Each of network 113 and network 111 may be the internet or may include or represent any public or private communications network or other network. For instance, network 113 may be a cellular, Wi-Fi®, ZigBee®, Bluetooth®, Near-Field Communication (NFC), satellite, enterprise, service provider, and/or other type of network enabling transfer of data between computing systems, servers, computing devices, and/or storage devices. One or more of such devices may transmit and receive data, commands, control signals, and/or other information across network 113 or network 111 using any suitable communication techniques. Each of network 113 or network 111 may include one or more network hubs, network switches, network routers, satellite dishes, or any other network equipment. Such network devices or components may be operatively inter-coupled, thereby providing for the exchange of information between computers, devices, or other components (e.g., between one or more client devices or systems and one or more computer/server/ storage devices or systems). Each of the devices or systems illustrated in FIGS. 1A-1B may be operatively coupled to network 113 and/or network 111 using one or more network links. The links coupling such devices or systems to network 113 and/or network 111 may be Ethernet, Asynchronous Transfer Mode (ATM) or other types of network connections, and such connections may be wireless and/or wired connections. One or more of the devices or systems illustrated in FIGS. 1A-1B or otherwise on network 113 and/or network 111 may be in a remote location relative to one or more other illustrated devices or systems.

Application system 102, may generate objects 122 and other data that cloud infrastructure system 120 may store. For example, application system 102 may generate objects 122 and store objects 122 at cloud infrastructure system 120. In some examples, application system 102 may create objects 122 through cloud infrastructure system 120. For instance, application system 102 may execute an application provided by cloud infrastructure system 120 (e.g., a Web or other application) which creates and stores objects 122 on cloud infrastructure system 120. For this reason, application system 102 may alternatively be referred to as a "source system." Objects 122 that are stored may include files, virtual machines, databases, applications, pods, containers, any of workloads 174, system images, directory information, or other types of objects used by application system 102. Application system 102 may communicate directly with cloud infrastructure system 120 via network 111 to access services provided by cloud infrastructure system 120. For example, application system 102 may create and store one or more objects 122 through communication with cloud infrastructure system 120 via network 111.

Application system 102, using file system 153 provided by data platform 150 may, in addition to generating, creating, storing, and managing objects 122 at cloud infrastructure system 120, generate objects and other data that file system manager 152 creates, manages, and causes to be stored to storage system 105. Application system 102 may for some purposes communicate directly with storage system 105 via network 111 to transfer objects, and for some purposes communicate with file system manager 152 via network 111 to obtain objects or metadata indirectly from storage system 105. File system manager 152 generates and stores metadata to storage system 105. The collection of data stored to storage system 105 and used to implement file system 153 is referred to herein as file system data. File system data may include the metadata and objects. Metadata may include file system objects, tables, trees, or other data structures; metadata generated to support deduplication; or metadata to support snapshots. Objects that are stored may include files, virtual machines, databases, applications, pods, containers, any of workloads 174, system images, directory information, or other types of objects used by application system 102. Objects of different types and objects of a same type may be deduplicated with respect to one another.

Data platform 150 includes backup manager 154 that generates one or more backups 142 of objects 122 stored on cloud infrastructure system 120. In the example of system 100, backup manager 154 creates backups 142 of objects 122, stored by cloud infrastructure system 120, and stores such backups 142 at storage system 115 via network 111.

Storage system 115 includes one or more storage devices 140A-140X (collectively, "storage devices 140"). Storage devices 140 may represent one or more physical or virtual compute and/or storage devices that include or otherwise have access to storage media. Such storage media may include one or more of Flash drives, solid state drives (SSDs), hard disk drives (HDDs), optical discs, forms of electrically programmable memories (EPROM) or electrically erasable and programmable (EEPROM) memories, and/or other types of storage media. Different storage devices of storage devices 140 may have a different mix of types of storage media. Each of storage devices 140 may include system memory. Each of storage devices 140 may be a storage server, a network-attached storage (NAS) device, or may represent disk storage for a compute device. Storage system 115 may include redundant array of independent disks (RAID) system. Storage system 115 may be capable of storing much larger amounts of data than storage system 105. Storage devices 140 may further be configured for long-term storage of information more suitable for backup purposes.

In some examples, storage system 105 and/or 115 may be a storage system deployed and managed by a cloud storage provider and referred to as a "cloud storage system." Example cloud storage providers include, e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC. In some examples, storage system 115 is co-located with storage system 105 in a data center, on-prem, or in a private, public, or hybrid private/public cloud. Storage system 115 may be considered a "backup" or "secondary" storage system for primary storage system 105. Storage system 115 may be referred to as an "external target" for backups 142. Where deployed and managed by a cloud storage provider, storage system 115 may be referred to as "cloud storage." Storage system 115 may include one or more interfaces for managing transfer of data between storage system 105 and storage system 115 and/or between application system 102 and storage system 115. Data platform 150 that supports application system 102 may rely on primary storage system 105 to support latency sensitive applications. However, because storage system 105 is often more difficult or expensive to scale, data platform 150 may use secondary storage system 115 to support secondary use cases such as backup and archive. In general, a backup 142 is a copy of objects 122 stored on cloud infrastructure system 120 to support quick recovery, often due to some data loss in or unavailability of cloud infrastructure system 120, and an archive is a copy of objects 122 to support longer term retention and review. The "copy" of objects stored on cloud infrastructure system 120 may include such data as is needed to restore or view objects 122 stored on cloud infrastructure system 120 in their state at the time of the backup 142 or archive.

Backup manager 154 may backup objects 122 at any time in accordance with archive policies that specify, for example, archive periodicity and timing (daily, weekly, etc.), which objects 122 are to be archived, an archive retention period, storage location, access control, and so forth. An initial backup 142 of file system data corresponds to a state of objects 122 at an initial backup time (the backup creation time of initial backup 142). Initial backup 142 may include a full backup of objects 122 or may include less than a full backup of objects 122, in accordance with one or more backup policies. For example, initial backup 142 may include all objects 122 stored on cloud infrastructure system 120 or one or more selected objects 122 stored on cloud infrastructure system 120.

One or more subsequent incremental backups 142 of objects 122 may correspond to respective states of the file system 153 at respective subsequent archive creation times, i.e., after the backup creation time corresponding to initial backup 142. A subsequent backup may include an incremental backup 142 of file system 153. A subsequent backup

142 may correspond to an incremental backup of one or more objects 122 stored on cloud infrastructure system 120. In some examples, one or more of objects 122 stored on cloud infrastructure system 120 at the initial backup creation time may also be stored on storage system 105 at the subsequent backup creation times. A subsequent incremental backup may include data that was not previously stored to storage system 115. Data of objects 122 that are included in subsequent backup 142 may be deduplicated by backup manager 154 against file system data that is included in one or more previous backups, including the initial backup, to reduce the amount of storage used. (Reference to a "time" in this disclosure may refer to dates and/or times. Times may be associated with dates. Multiple backups 142 may occur at different times on the same date, for instance.)

In system 100, backup manager 154 stores objects 122' to storage system 115 as backups 142, using chunkfiles 162. Backup manager 154 may use any of backups 142 to subsequently restore objects 122 (or portion(s) thereof) to their state at the backup creation time, or backup 142 may be used to create or present a new file system (or "view") of objects 122' contained in backup 142, for instance. As noted above, backup manager 154 may deduplicate data included in a subsequent backup against file system data that is included in one or more previous backups. For example, data (e.g., chunk(s)) of a second object 122' and included in a second backup 142 may be deduplicated against data of a first object 122' included in a first, earlier backup 142. Backup manager 154 may remove a data chunk ("chunk") of the second object and generate metadata with a reference (e.g., a pointer) to a stored chunk of chunks 164 in one of chunkfiles 162. The stored chunk in this example is an instance of a chunk stored for the first object.

Backup manager 154 may apply deduplication as part of a write process of writing (i.e., storing) object 122' to one of backups 142 in storage system 115. Deduplication may be implemented in various ways. For example, the approach may be fixed length or variable length, the block size for the file system may be fixed or variable, and deduplication domains may be applied globally or by workload. Fixed length deduplication involves delimiting data streams at fixed intervals. Variable length deduplication involves delimiting data streams at variable intervals to improve the ability to match data, regardless of the file system block size approach being used. This algorithm is more complex than a fixed length deduplication algorithm but can be more effective for most situations and generally produces less metadata. Variable length deduplication may include variable length, sliding window deduplication. The length of any deduplication operation (whether fixed length or variable length) determines the size of the chunk being deduplicated.

In some examples, the chunk size can be within a fixed range for variable length deduplication. For instance, backup manager 154 can compute chunks having chunk sizes within the range of 16-48 KB. Backup manager 154 may eschew deduplication for objects that that are less than 16 kB. In some example implementations, when data of object 122' is being considered for deduplication, backup manager 154 compares a chunk identifier (ID) (e.g., a hash value of the entire chunk) of the data to existing chunk IDs for already stored chunks. If a match is found, backup manager 154 updates metadata for object 122' to point to the matching, already stored chunk. If no matching chunk is found, backup manager 154 writes the data of object 122' to storage as one of chunks 164 for one of chunkfiles 162. Backup manager 154 additionally stores the chunk ID in chunk metadata, in association with the new stored chunk, to allow for future deduplication against the new stored chunk. In general, chunk metadata is usable for generating, viewing, retrieving, or restoring objects stored as chunks 164 (and references thereto) within chunkfiles 162, for any of backups 142, and is described in further detail below.

Each of chunkfiles 162 includes multiple chunks 164. Chunkfiles 162 may be fixed size (e.g., 8 MB) or variable size. Chunkfiles 162 may be stored using a data structure offered by a cloud storage provider for storage system 115. For example, each of chunkfiles 162 may be one of an S3 object within an AWS cloud bucket, an object within AZURE Blob Storage, an object in Object Storage for ORACLE CLOUD, or other similar data structure used within another cloud storage provider storage system. Any of chunkfiles 162 may be subject to a write once, ready many (WORM) lock having a WORM lock expiration time. A WORM lock for an S3 object is known as an "object lock" and a WORM lock for an object within AZURE Blob Storage is known as "blob immutability."

The process of deduplication for multiple objects over multiple backups results in chunkfiles 162 that each have multiple chunks 164 for multiple different objects associated with the multiple backups. In some examples, different backups 142 may have objects 122' that are effectively copies of the same data, e.g., for an object that has not been modified. In backup 142, an object 122' may be represented or "stored" as metadata having references to chunks that enable object 122' to be accessed. Accordingly, description herein to a backup "storing," "having," or "including" an object 122' includes instances in which the backup does not store the data for object 122' in its native form.

The initial backup and the one or more subsequent incremental backup of backups 142 may each be associated with a corresponding retention period and, in some cases, a data lock period for the backup. As described above, a data management policy (not shown) may specify a retention period for an archive and a data lock period for backup 142. A retention period for backup 142 is the amount of time for which the backup and the chunks that objects 122' of the backup reference are to be stored before the backup and the chunks are eligible to be removed from storage. The retention period for backup 142 begins when the backup is stored (the backup creation time). A chunkfile containing chunks that objects of a backup reference and that are subject to a retention period of the archive, but not subject to a data lock period for backup 142, may be modified at any time prior to expiration of the retention period. The nature of such a modification must be such to preserve the data referenced by objects 122' of backup 142.

A user or application associated with application system 102 may have access (e.g., read or write) to backups 142 that are stored in storage system 115. The user or application may delete some of the data due to a malicious attack (e.g., virus, ransomware, etc.), a rogue or malicious administrator, and/ or human error. The user's credentials may be compromised and as a result, backups 142 that are stored in storage system 115 may be subject to ransomware. To reduce the likelihood of accidental or malicious data deletion or corruption, a data lock having a data lock period may be applied to a backup.

As described above, chunkfiles 162 may represent an object in storage system 115, which may also be referred to as "backup storage system 115, that conform to an underlying architecture of archive storage system 115. Data platform 150 includes backup manager 154 that supports backups 142 of data in the form of chunkfiles 162, which interface with archive storage system 115 to store chunkfiles 162 after forming chunkfiles 162 from one or more chunks

164 of data. Backup manager 154 may apply a process referred to as "deduplication" with respect to chunks 164 to remove redundant chunks and generate metadata linking redundant chunks to previously stored chunks 164 and thereby reduce storage consumed (and thereby reduce storage costs in terms of storage required to store the chunks). Backup manager 154 may aggregate chunks 164 with metadata to form chunkfile 162 at backup storage system 115.

In cloud infrastructure systems/services, service identifiers may be provided to clients and used to authenticate requests (e.g., API calls) to cloud infrastructure (e.g., AMAZON WEB SERVICES (AWS™) by AMAZON, INC., AZURE® by MICROSOFT, INC., DROPBOX™ by DROPBOX, INC., ORACLE CLOUD™ by ORACLE, INC., and GOOGLE CLOUD PLATFORM (GCP) by GOOGLE, INC.), such as by including a service identifier in each request to the cloud infrastructure. Service identifiers may be unique identifiers comprising, alphanumeric characters (e.g., universally unique identifiers (UUIDs)), random data, cryptographic or other tokens, or other uniquely identifying information that may be assigned to an entity (e.g., a customer) and allow authentication of requests from the entity.

Some systems may make requests to a cloud infrastructure in an uncoordinated manner and may be throttled by the cloud infrastructure as a result. For example, a system utilizing OFFICE 365 infrastructure adapters (e.g., O365 adapters) may suffer from throttling by such cloud infrastructure. Several factors may contribute to such throttling, such as: (1) use of multiple service identifiers which, when used in aggregate might start nearing internal tenant throttling limits; (2) aggressive or excessive requests through a single service identifier; (3) non-optimal handling of different kinds of throttling headers that the cloud infrastructure sends; and (4) non-optimal request patterns (e.g., making certain kinds of requests aggressively or excessively).

To illustrate, a cloud infrastructure job may eventually require K permits and will result in a number of sub-tasks. Each sub-task may make an unbounded number of requests. The requests may be so unbounded that a large number of outstanding connections per node (e.g., 800 connections per node) can sometimes occur. On many deployments, service identifier limits are reached; however, further connections may not be stopped in a timely manner because of the many outstanding connections per node.

The problem is compounded because all service identifiers may be used by any node of the system. Therefore, a rate-limiting signal (e.g., retry headers) might be received at different times on different nodes and each node may react independently. Such an uncoordinated approach results in the cloud infrastructure throttling even more. To illustrate, further throttling can be expected in a five node cluster where all nodes are sending requests to the cloud infrastructure simultaneously and the cloud infrastructure is at the cusp of exhausting its limits.

In some examples, the cloud infrastructure may be modeled as a token bucket where all the tokens are about to be exhausted. Just after exhaustion, any subsequent requests to the cloud infrastructure will result in the token bucket going into the negative token territory. Since the rate of token replenishment at the cloud infrastructure might be slower than the rate of requests (including retries), recovery from the throttled condition may not be possible for a very long time (e.g., 15 minutes or more) with the cloud infrastructure throttling even more with time.

To illustrate, at time T1, a cloud infrastructure may have exhausted all available tokens before any requests have been rejected. Subsequently, the cloud infrastructure may start to throttle requests. Continuing this example, at time T2, five API calls are made which causes the cloud infrastructure's token bucket (e.g., available token count) to go into the negative token territory of –5, assuming each request consumes one token. The token replenishment rate for the cloud infrastructure may ensure only three tokens are replenished by time T3 and, as such, there is a net negative number of tokens, namely –2 tokens. Due to the uncoordinated nature of requests across all the nodes, five more requests are made, leading to a net token count of –7 at the cloud infrastructure. As can be seen, the situation (e.g., a token deficit and cloud infrastructure throttling) may degrade further and may recover only when the time period between retries (or other requests) becomes sufficiently large. During such time period, which may be lengthy (e.g., 15 minutes or more) the cloud infrastructure may be unresponsive or slow to respond (e.g., throttled).

In accordance with the described techniques, data platform 150 may adaptively throttle based on rate-limiting signals from cloud infrastructure, in a coordinated manner. For example, storage system 105 of data platform 150 may include storage nodes 180 that execute one or more processes to adaptively throttle requests (e.g., API calls) to cloud infrastructure system 120. As shown for illustrative purposes by arrow A of FIG. 1A and described herein, data platform 150 may make requests to cloud infrastructure system 120, such as through storage system 105 and network 111. Data platform 150 may assign one or more service identifiers, received from cloud infrastructure system 120, to each storage node 180, with each storage node 180 having a different set of one or more service identifiers. A storage node 180A may send requests to cloud infrastructure system 120 only with a service identifier assigned to storage node 180A. In this manner, requests to cloud infrastructure system 120 including a particular service identifier are made (e.g., sent) through a particular storage node 180A and, as described further below, storage node 180A may coordinate a response to a rate-limiting signal for the service identifier by sending or throttling requests including the service identifier.

Some examples of cloud infrastructure system 120, include MICROSOFT 365®, OFFICE 365®, and AZURE® by MICROSOFT® Corporation, AMAZON WEB SERVICES (AWS™) by AMAZON, INC., by MICROSOFT, INC., DROPBOX™ by DROPBOX, INC., ORACLE CLOUD™ by ORACLE, INC., and GOOGLE CLOUD PLATFORM (GCP) by GOOGLE, INC and other cloud service or infrastructure provider systems. In some examples, one or more of storage systems 115 may be example(s) of cloud infrastructure system(s) to which data platform 150 may send requests.

The described techniques may provide one or more technical advantages that realize a practical application. For example, the described techniques may provide one or more of the following advantages: (1) a throttling infrastructure (e.g., storage system 105) centered around and responsive to the dynamics of HTTP requests; and (2) a throttling infrastructure compatible with or extendable to various kinds of throttling criteria based on requirements of individual cloud infrastructure systems 120. For example, the disclosed techniques may scale to work with any cluster size/configuration, various kinds of customer tenant configurations (e.g., big/medium/small customer deployments), or both. In some examples, the disclosed techniques do not assume constant numbers for throttling but may assume throttling may vary with time.

The disclosed techniques may support service identifiers from various providers of cloud infrastructure system 120 and/or the provider of data platform 150. In some examples, the disclosed techniques may maximize throughput even when one service identifier is available, maximize backup throughput with given resources, or both. The disclosed techniques may attempt to not to aggressively exceed tenant level limits and cause tenant level downtime (e.g., throttling) and may measure the impact of throttling related changes. Though described, in some cases, with respect to particular cloud infrastructure systems 120, data platform 150 may perform the described techniques with respect to a variety of cloud infrastructures from different cloud service providers.

Storage system 105 may include storage nodes 180 that adaptively throttle requests based on rate-limiting signals from cloud infrastructure system 120. In some examples, rate-limiting signals may comprise overload signals or rate-limit signals. For instance, cloud infrastructure system 120 may send an overload signal such as a "HTTP status 429 (Too many requests)" header, which may include a possible "Retry-After" header and send a rate-limit signal such as a "HTTP RateLimit" header.

Storage nodes 180 may comprise compute devices that execute software for adaptive throttling, such as throttle server 155 and throttle units 156. Though not shown at each storage node 180 in FIG. 1A, at least a subset of storage nodes 180 may include throttle server 155 and one or more throttle units 156. Throttle units 156 may make (e.g., send) and throttle (e.g., refrain from sending for at least a period of time) requests to cloud infrastructure system 120. For example, each throttle unit 156 may determine whether to send or refrain from sending, for at least a delay period (e.g., 1 millisecond (ms)), a request to cloud infrastructure system 120, and send or refrain from sending the request based on such determination. Throttle unit 156 may determine whether to send or refrain from sending a request (e.g., throttle) based on context information 159 (e.g., state information). Throttle server 155 may maintain (e.g., create, store, update, delete) context information 159, such as at storage device 105. As described further below, context information 159 may comprise information that indicates or allows determination of a level, amount, and/or limit of resource consumption or utilization at cloud infrastructure system 120 that allows throttle units 156 to determine whether to throttle requests to cloud infrastructure system 120.

As stated above, each storage node 180 that includes throttle server 155 may be assigned at least one service identifier. For example, storage node 180A may be assigned service identifier "001A." One or more throttle units 156 of a storage node 180A may include such assigned service identifier in requests throttle units 156 make to cloud infrastructure system 120. Context information 159 may include information for a plurality of service identifiers and throttle units 156 may determine whether to send or throttle a request to cloud infrastructure system 120 based on context information 159 for the service identifier throttle units 156 will include in the request (e.g., the service identifier assigned to storage node 180A).

Each throttle unit 156 may include a network driver, such as an HTTP driver, that sends and/or receives data. For example, throttle unit 156 may include a network driver, such as a Client for URL ("CURL") driver, that sends requests and receives responses to such requests. The network driver may be threaded or unthreaded and may record a count of requests made by the network driver. In some examples, the number of threads may indicate the number of current requests made by throttle unit 156 (e.g., one request per thread). Throttle unit 156 may send the number of current requests to throttle server 155 and throttle server 155 may update the context information with the same.

Throttle units 156 may receive a variety of responses from cloud infrastructure service 120 in response to a request. Throttle units 156 may relay (e.g., send) the response, or information therein, to throttle server 155 and throttle server 155 may use the response, or information therein, to update context information 159, such as context information 159 for a particular service identifier. Throttle units 156 may then determine whether to send or throttle requests including the particular service identifier based on context information 159 as updated by throttle server 155. In this manner, storage system 105 coordinates the throttling of requests using any particular service identifier.

In some examples, cloud infrastructure system 120 may send a response including a "SUCCESS" or "FAILED" indicator that indicates, respectively, whether the request succeeded (e.g., is accepted by cloud infrastructure system 120 without error) or failed. Upon receiving a response from cloud infrastructure system 120, throttle server 155 may update context information 159, such as by decrementing a CurrentConcurrency metric, reducing a CurrentRate metric, or both such as to reflect that a request is no longer current (e.g., outstanding). In operation, throttle unit 156 may make a request and receive a response to the request from cloud infrastructure system 120. As such, for throttle server 155 to receive the response, throttle unit 156 may forward (e.g., send) the response to throttle server 155 thereby allowing throttle server 155 to receive the response.

In some examples, cloud infrastructure system 120 may include one or more rate-limiting signals in a response to throttle unit 156. For example, throttle unit 156 may receive a response comprising an overload header, rate-limit header, or both from cloud infrastructure system 120. In response to a rate-limit header, throttle server 155 may update context information 159 with information from the rate-limit header, such as described below. In response to an overload header (e.g., an HTTP 429 response header), throttle server 155 may determine a time for the next retry of the request, such as based on a time period in a "Retry-After" header. In some examples, the Retry-After time period may be received by throttle unit 156 in a Retry-After header from cloud infrastructure system 120 or may be determined by throttle server 155, such as described further below. In some cases, a response timeout may occur, such as when throttle unit 156 does not receive a response from cloud infrastructure system 120 within a predefined period of time. In response to a response timeout, throttle server 155 may update context information 159 and throttle unit 156 may attempt to retry the request, such as described further below.

Various client devices may be a source or origin device of requests that storage system 105 adaptively throttles. For example, storage system 105, application system 102, or elements thereof (e.g., storage nodes 180, application servers 170) may constitute client devices. Such client devices may be compute devices that execute client software, such as adapter 175 and throttle client 176, for making requests to cloud infrastructure system 120 through storage system 105. Though not shown at each client device (e.g., storage node 180, application server 170) in FIG. 1A, each client device may include and execute adapter 175, throttle client 176, or both.

Client devices may make requests through storage system 105 for various purposes. In some examples, client devices, such as storage nodes 180 of storage system 105, may request objects 122 from cloud infrastructure system 120. Data platform 150, such as through backup manager 154, may backup objects 122 to storage system 115, such as in one or more chunks 164 or chunkfiles 162. As described above, storage system 105 may first accumulate data (e.g., chunks 164) of the objects 122 received from cloud infrastructure system 120 prior to backup to storage system 115. In some examples, application servers 170, mobile device 108, user device 109, or other devices may be client devices and request objects 122 or other data/services from cloud infrastructure system 120 through storage system 105.

Throttle client 176 may receive request information from a client device and relay (e.g., send) the request information to a throttle server 155 of a storage node 180, which sends the request through throttle unit 156 to cloud infrastructure system 120. The request information may comprise parameters or other information to make a valid request (e.g., a particular API call) to cloud infrastructure system 120, a name or identifier of the request (e.g., API endpoint), or both.

Throttle client 176 may select a throttle unit 156A and storage node 180 and cause request information from a client device to be sent, in the form of a request, to cloud infrastructure system 120 through throttle unit 156A. For example, throttle client 176 at storage node 180A may receive request information from a process or other element of storage node 180A. Throttle client 176 may select a throttle unit 156 of storage nodes 180 and relay (e.g., send) the request to throttle server 155 of selected throttle unit 156. For example, throttle client 176 at storage node 180A may select throttle unit 156A of storage node 180A and relay a request to throttle server 155 of selected throttle unit 156. Throttle client 176 may select a throttle unit 156 based on various criteria such as load information (e.g., the amount of load) pertaining to one or more of throttle units 156 utilizing the service identifier. Throttle server 155 may maintain load information in context information 159.

Storage node 180A may receive the relayed request from throttle client 176 and storage node 180A, such as through throttle server 155 of storage node 180A, may forward (e.g., send) the request to throttle unit 156A. Throttle unit 156A may generate a request with the request information and send the request to cloud infrastructure system 120. For example, throttle unit 156A may identify an endpoint and parameters for the request from the request information and generate the request to cloud infrastructure system 120 based on such request information.

Throttle client 156 may relay request information using various protocols. For example, throttle client 156 of storage node 180A and throttle server 155 of storage node 180A may communicate request information through gRPC or other communication protocols or frameworks. In some examples, request information may be relayed by encapsulating the request from a client device (e.g., storage node 180A), or a portion thereof, in a message or field of the communication protocol and sending the request, or potion thereof, to throttle unit 156A of storage node 180A. Throttle server 155 may assign a unique identifier (e.g., UUID), such as a "ThrottleUnitId" to each throttle unit 156 and throttle clients 156 may include such unique throttle unit identifier in the request information. Upon receiving request information, throttle server 155 may determine which throttle unit 156 to forward the request information to based on the unique identifier in the request information.

In some examples, adapter 175, throttle client 176, or both may be included in and executed on client devices (e.g., storage nodes 180 or application servers 170). For example, each storage node 180 or a subset of storage nodes 180 may include an execute adapter 175, throttle client 176, or both. In some examples, a first subset of storage nodes 180 may be designated as servers and a second subset of storage nodes 180 may be designated as clients for adaptive throttling purposes. For instance, each storage node 180 of the first subset of storage nodes 180 may respectively include throttle servers 155 and throttle units 156 and each storage node 180 of the second subset of storage nodes 180 may respectively include adapters 175 and throttle clients 176. The first subset and second subset may contain different sets of storage nodes 180. For example, the first subset may contain a first node 180A while the second subset contains another storage node 180N. In some examples, storage nodes 180 may be capable of operating as a client and as a server. For instance, storage node 180A may include throttle server 155, throttle units 156, adapter 175, and throttle client 176.

Adapter 175 may be an interface or translator between client devices and an interface (e.g., API) of cloud infrastructure system 120. For example, adapter 175 may receive input, such as request parameters, from a client device and generate a request from such input formatted according to an API or other interface of cloud infrastructure system 120. In such cases, the request from adapter 175 may be sent to and received by throttle client 176. Throttle client 176 may relay the request (e.g., request information) to throttle unit 156A such as described above. Throttle unit 156A may obtain the request from the request information or generate a request based on the request information and send the request to cloud infrastructure system 120, when throttle unit 156A does not determine to throttle the request. In some examples, adapter 175 may instantiate (e.g., create) throttle client 176 to send request information to throttle unit 156, such as through throttle server 155.

As described above, data platform 150 may include a plurality of throttle servers 155. For example, each storage node of storage nodes 180 may include a throttle server 155. Throttle server 155 may manage zero or more throttle units 156, such as any throttle units 156 residing on the same storage node 180 as throttle server 155. Throttle server 155 may be an endpoint for communication with throttle clients 176. For example, throttle server 155 may provide the gRPC or other interface for communication with throttle clients 176, such as to receive request information from throttle clients 176.

Throttle servers 155 may select or elect a throttle server to be a master throttle server 155. Throttle servers 155 may randomly select the master throttle server or apply one or more heuristics for the same. Unselected throttle servers 155 may be considered slave throttle servers. For example, throttle server 155 at storage node 180A may be the master throttle server and throttle servers 155 at storage nodes 180B-180N may accordingly be slave throttle servers. A storage node 180A executing the master throttle server 155 may be referred to as a "master storage node" and the remaining storage nodes 180 executing slave throttle servers 155 may be referred to as a "slave storage nodes." Master throttle server 155 may perform distinct operations as compared to slave throttle servers 155. For example, master and slave throttle servers 155 may each receive request information and send request information to throttle units 156, but only the master throttle master may maintain context information in some examples.

Master throttle server 155 may also instantiate (e.g., create) throttle units 156 at storage nodes 180, such as slave storage nodes. For example, master throttle server 155 may monitor utilization of a service identifier and assign the service identifier to one or more slave throttle servers 155. Responsive to the assignment of the service identifier, slave storage nodes 180 may create one or more throttle units 156 assigned to the service identifier. Master throttle server 155 may update context information 159 to include the mapping of the created throttle units 156 to storage nodes 180. Throttle clients 176 may access such mapping in context information 159 and send request information to a throttle unit 156 assigned to a particular service identifier based on the mapping.

Throttle server 155, such as the throttle server elected as the master throttle master, may maintain (e.g., create, store, delete, and update) context information 159. In some examples, throttle server 155 may store context information 159, such as at storage system 105 or at another storage device. Throttle server 155 may maintain context information 159 as a global state reference for storage system 105 and may assign at least a portion of context information 159 to one or more of a plurality of service identifiers. Throttle units 156 may access such global state (e.g., the context information) to determine, on a per service identifier basis, whether to send or throttle requests including particular service identifiers prior to sending requests. In this manner, rather than responding to rate-limit signals on a per thread/node basis, data platform 150 may orchestrate a coordinated response to rate-limiting signals.

In some examples, throttle server 155 may include keys, mappings, metrics, counters, parameters or other information in context information 159. For instance, throttle server 155 may include a "ThrottleInfraState" that stores the state of storage system 105 in context information 159. Such throttling system state information may constitute a mapping that identifies the location of throttle units 156. For example, throttle server 155 may store a unique ThrottleUnitId for each throttle unit 156 along with an indication of the storage node 180 on which throttle unit 156 resides (e.g., storage node 180 on which throttle unit 156 executes). In this manner, context information 159 forms a mapping between throttle unit 156A and the location of throttle unit 156A (e.g., storage node 180A at which throttle unit 156A executes). Throttle server 155 may map other information to throttle unit 156, such as the service identifier assigned to the throttle unit 156, one or more capabilities of the throttle unit 156, or both, by storing such information along with the ThrottleUnitId in context information 159.

Throttle server 155 may associate portions of context information 159 with different service identifiers. For example, throttle server 155 may include an indication of a service identifier in context information 159 to associate at least a portion of context information 159 (e.g., metrics for the service identifier) to the service identifier.

Context information 159 may include various information related to resource consumption or utilization for a service identifier. For example, throttle server 155 may maintain metrics, such as target metrics, which may indicate a maximum or target measure or state, and current metrics, which may indicate a current measure or state (e.g., current resource consumption or utilization). For instance, throttle server 155 may maintain metrics such as "MaxConcurrency" and "CurrentConcurrency" and "MaxRate" and "CurrentRate" in the context information for each of a plurality of service identifiers.

MaxConcurrency may refer to the maximum number of outstanding requests that are allowed for the service identifier. CurrentConcurrency may refer to the number of concurrent (e.g., outstanding) requests using the service identifier. Throttle unit 156 may maintain a local CurrentConcurrency for the service identifier (e.g., the current number of outstanding requests by throttle unit 156) and send the local CurrentConcurrency to throttle server 155 to update context information 159 with such local information. Throttle units 156 may determine the total count of concurrent requests for all throttle units 156 using the same service identifier may be the sum of the CurrentConcurrency at each throttle unit 156 assigned to the service identifier.

MaxRate may refer to the maximum number of requests including the service identifier within a particular timespan (e.g., 1 minute). CurrentRate may refer to the current rate of requests including the service identifier within a particular timespan (e.g., 1 minute). Throttle unit 156 may maintain a local CurrentRate for the service identifier (e.g., the current rate of requests by throttle unit 156). In this manner, the aggregate CurrentRate across throttle units 156 using the same service identifier may be the CurrentRate at each throttle unit 156 assigned to the service identifier.

Context information 159 may also store rate-limiting information from rate-limiting signals that data platform 150 receives from cloud infrastructure service 120. In some examples, rate-limiting signals may comprise response headers, such as rate-limit headers, from cloud infrastructure service 120. Throttle server 155 may receive the rate-limiting information, such as through throttle unit 156. For example, in response to a request to cloud infrastructure service 120, throttle unit 156 may receive a response from cloud infrastructure service 120 with a rate-limit header. Throttle unit 156 may relay (e.g., transmit) rate-limiting information form the rate-limiting signals to throttle server 155 (e.g., the master throttle server) and throttle server 155 may update context information 159 with the rate-limiting information. Throttle server 155 may store rate-limiting information along with the service identifier of the request in the context information. In this manner, to determine whether to send or throttle a request for their respective service identifiers, throttle units 156 may access the rate-limiting information for their respective service identifiers in the context information.

Cloud infrastructure system 120 may generate and send rate-limit headers to indicate to data platform 150 to slow or reduce the rate and/or number of requests from data platform 150. In general, cloud infrastructure system 120 may send rate-limit headers when requests exceed an internal quota or limit of cloud infrastructure system 120 within a given timespan. For example, cloud infrastructure system 120 may begin sending rate-limit headers when requests from data platform 150 (and/or other sources) reach 80% of the internal quota of cloud infrastructure system 120.

Cloud infrastructure system 120 may send one or more rate-limit headers by including rate-limit header(s) in responses to requests from data platform 150, such as requests from throttle units 156 at storage nodes 180. Cloud infrastructure system 120 may include various rate-limiting information in a rate-limit header. For example, cloud infrastructure system 120 may send rate-limit headers including a "RateLimit-Limit" field, a "RateLimit-Reset" field, a "RateLimit-Remaining" field, or various subsets thereof. A RateLimit-Limit may be the number of resource units (e.g., number of requests) allowed for the timespan the rate-limit header has been sent for. The timespan may be specified or unspecified in the rate-limit header. For example, rather than being specified in a rate-limit header, the timespan may be a predefined period of time previously sent by cloud infrastructure system 120 to data platform 150 or may be a predefined constant period of time stored on and used by cloud infrastructure system 120 and data platform 150. A RateLimit-Reset may indicate the number of seconds that are left before the rate-limit header timespan expires. A RateLimit-Remaining may be the number of resource units worth of requests (e.g., 1 request when 1 resource unit is equal to 1 request) that can be made within the RateLimit-Reset period (e.g., 3 seconds) before a retry header is returned (e.g., sent) by cloud infrastructure system 120).

In some examples, RateLimit-Limit, RateLimit-Reset, and RateLimit-Remaining may be stored for every rate-limit header that is received by data platform 150. For example, throttle unit 156 may receive a rate-limit header from cloud infrastructure system 120 and relay the rate-limit header, or the information therein, to throttle server 155 (e.g., master throttle server). Throttle server 155 may store the rate-limit header (e.g., RateLimit-Limit, RateLimit-Reset, and Rate-Limit-Remaining) in the context information.

Some systems may respond to rate-limit headers by stopping or slowing the rate of requests. In some multi-threaded/distributed environments, by the time all threads/nodes stop/slow down requests, the internal quota for the timespan may be exhausted (e.g., 100% or more of the internal quota may be used). The degree of concurrency/rate may determine how close a system is to exhausting the quota for the timespan. The higher the concurrency/rate, the closer the system is exhausting the quota. Conversely, the lower the concurrency/rate, the more profitable it will be to throttle requests a little later than the 80% threshold (e.g., 85% or 90%).

To correctly handle these cases, throttle server 155 may maintain minimum capacity threshold information, one a per service identifier basis, which may indicate the amount of a quota that should be remaining when a throttle unit 156 determines to refrain from sending a request (e.g., throttle). For example, the minimum capacity threshold information may be a percentage, such as between 0% and 20%. The minimum capacity threshold may be a predefined constant value (e.g., percentage) and may not change for a given service identifier in some examples.

Rate-limit signals may comprise overload headers. For instance, cloud infrastructure system 120 may send an overload header, such as an HTTP 429 header (Too many requests) that indicates when cloud infrastructure service 120 wants to throttle incoming requests (e.g., has received or is responding to too many requests). The 429 header may be sent along with a "Retry-After" header which specifies a delay period (e.g., the number of seconds) after which a request might be retried. Storage system 105 may adaptively throttle requests by retrying requests according to the delay period in a Retry-After header, such as by resending a request after the delay period has elapsed.

Some example reasons why cloud infrastructure system 120 may send 429 headers include service identifier and/or tenant level throttling and resource level throttling. Service identifier/tenant level throttling may occur when requests to cloud infrastructure system 120, such as from data platform 150, exceed the rate of resource unit replenishment or a quota/limit for requests including the service identifier. Tenant level throttling may occur when requests to cloud infrastructure system 120 exceed the rate of resource unit replenishment or a quota/limit which may be triggered by data platform 150 or other systems making requests to cloud infrastructure system 120. Responsive to receiving a 429 header from cloud infrastructure service 120 indicating service identifier or tenant level throttling, throttle units 156 may refrain from making (e.g., throttle) requests including the service identifier for at least a period of time (e.g., the delay period indicated in an accompanying Retry-After header).

Resource level throttling may occur when the type of service provided by cloud infrastructure system 120 (e.g., a particular API) has some limits to the rate at which the service may be accessed or requested. In such case, retrying a request after the delay period specified in the Retry-After header should be sufficient to avoid throttling by cloud infrastructure system 120 and the service identifier may not be blocked for all requests (e.g., other requests using the service identifier may not be throttled). For example, responsive to a 429 header indicating resource level throttling, throttle unit 156A may refrain from retrying the request for at least a period of time (e.g., the delay period in an accompanying Retry-After header) and other throttle units 156N may continue to send other requests including the service identifier.

In some cases, cloud infrastructure system 120 may not return the Retry-After header even with a 429 header. As such, throttle server 155 may, in some examples, determine the delay period, such as based on one or more heuristics, and store such delay period in the context information. For example, throttle server 155 may determine a "NextCall-Timestamp" that indicates a delay period (e.g., a timestamp or time period) at or after which requests including the service identifier may again be made by throttle unit 156. It is noted that in some examples, no action may be taken regarding in-flight requests (e.g., outstanding requests) after throttle server 155 determines and sets delay period (e.g., NextCallTimestamp). Responsive to determining the delay period (e.g., NextCallTimestamp) is set to a non-zero value (e.g., indicates some period of delay), throttle units 156 may plug (e.g., stop) requests including the service identifier until after the delay period elapses.

In some examples, cloud infrastructure system 120 may send rate-limit signals including timeout headers. A timeout that causes a timeout header to be sent may occur for various reasons (e.g., cloud infrastructure system errors, excess cloud infrastructure system load). Responsive to a receiving a timeout header indicating a request has timed out, throttle unit 156 may retry the timed out request a particular number of times (e.g., 3 times) or for some predetermined amount of time (e.g., 15 seconds). Throttle server 155 may maintain, in the context information, a "MaxRetryCount" indicating the particular number of times a request may be retried and/or a "MaxRetryTime" indicating the predetermined time in which the request may be retried.

Throttle server 155 may maintain other information in context information 159. For example, throttle server 155 may maintain a "ConcurrenyTrend" indicator in context information 159 that may indicate a trend direction (e.g., "up" or "down") for concurrent requests made by data platform 150. Throttle server 155 may set the Concurren-cyTrend to "down" when the maximum concurrency in the context information is decreased and set the Concurren-cyTrend to "up" when such maximum concurrency is increased. A default value for ConcurrencyTrend may be "up" in some examples. Throttle server 155 may maintain a related indicator for request rate, such as a "RateTrend" indicator that indicates a trend direction (e.g., "up" or "down") for request rates. For example, throttle server 155 may set RateTrend to "up" when the maximum rate in the context information is increased and set RateTrend to "down" when such maximum rate is decreased. In some examples, throttle server 155 may maintain a "LastConcurrencyChangeTimestamp" that indicates the last time (e.g., timestamp) when the maximum concurrency was adjusted (e.g., adjusted up or down).

Throttle server 155 may maintain various statistics in the context information. For example, throttle server 155 may store metrics or information indicating the kind of requests including the service identifier, request attributes, request types (e.g., GET or PUT), adapter type (e.g., MICROSOFT SHAREPOINT, MICROSOFT EXCHANGE, ONEDRIVE, MICROSOFT TEAMS), workload type (e.g., backup, restore, refresh). Other examples of metrics include that throttle server 155 may store in the context information include number of total retries, total number of API calls made, total waiting time due to throttling, total time taken, total number of bytes backed, and number of calls failed due to timeout errors. Throttle server 155 may store statistical information such as a time series profile of the timeouts and 429 errors a service identifier experienced, the latency profile of calls per service identifier, the profile of retry times subsequent receipt of a Retry-After header, queuing delay in the queue of throttle units 156 which can be further subdivided per service identifier.

As can be seen, throttle server 155 may maintain (e.g., create, store, update, and delete) context information 159 in response to sending requests from throttle units 156 and receiving responses to the requests from cloud infrastructure service 120. For instance, as described above, throttle server 155 may update context information 159 with information from rate-limiting signals received in responses from cloud infrastructure system 120. Individual throttle units 156 at individual storage nodes 180 may access context information 159, such as for a particular service identifier, to determine whether to send a request or throttle a request.

For example, throttle unit 156A may determine to refrain from sending requests (e.g., throttle) if the maximum consumed quota for throttle unit 156A exceeds 90% based on rate-limit headers. For instance, throttle unit 156A may throttle requests when less than 10% capacity (e.g., Mini-mumCapacityThreshold) remains and throttle requests until at least a delay period (e.g., RateLimit-Reset seconds or NextCallTimestamp) have elapsed. In some examples, throttle unit 156A may determine to throttle requests when NextCallTimestamp lies in future or because a Retry-After header was received in response to a request including the service identifier.

In some examples, throttle unit 156A may determine to throttle based on a comparison between target and current metrics for the service identifier. For example, throttle unit 156A may determine to throttle requests when, for the service identifier, CurrentCurrency is greater than or equal to MaxConcurrency, CurrentRate is greater than or equal to MaxRate, or both. CurrentCurrency being greater than or equal to MaxConcurrency, CurrentRate being greater than or equal to MaxRate, or both may indicate that the service identifier has been saturated (e.g., exceeds a quota or limit). Throttle unit 156A may execute these and other heuristics to determine to throttle request. When throttle unit 156A does not determine to throttle, such as on a per service identifier basis, throttle unit 156A may send one or more requests.

System 110 of FIG. 1B is a variation of system 100 of FIG. 1A in that data platform 150 stores backups 142 of objects 122 to storage system 115 that resides on premises or, in other words, local to data platform 150. In some examples of system 110, storage system 115 enables users or applications to create, modify, or delete chunkfiles 162 via file system manager 152. In system 110, storage system 105 of FIG. 1B may be a local storage system that may be used by backup manager 154 for initially storing and accumulating chunks representing the data of objects 122 prior to a backup to storage system 115.

Figure 2:
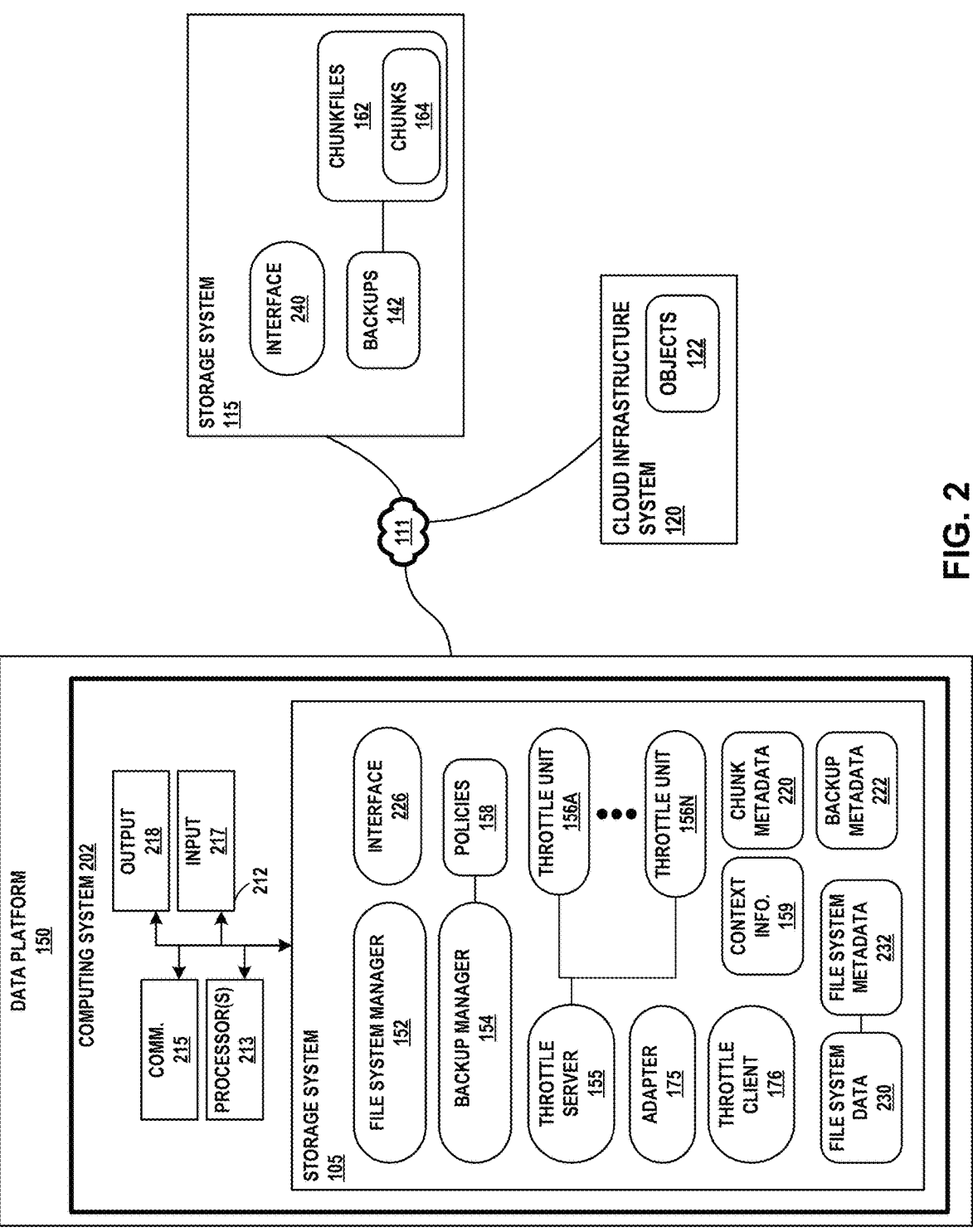
FIG. 2 is a block diagram illustrating example systems that perform adaptive throttling based on rate-limiting signals from cloud infrastructure, in accordance with techniques of this disclosure.

FIG. 2 is a block diagram illustrating example systems that perform adaptive throttling based on rate-limiting signals from cloud infrastructure, in accordance with techniques of this disclosure. Systems 200 of FIG. 2 may be described as an example or alternate implementation of system 100 of FIG. 1A or system 110 of FIG. 1B (where backups are written to a local storage system 115). One or more aspects of FIG. 2 may be described herein within the context of FIG. 1A and FIG. 1B.

In the example of FIG. 2, system 200 includes network 111, data platform 150 implemented by computing system 202, and storage system 115. In FIG. 2, network 111, cloud infrastructure system 120, data platform 150, and storage system 115 may correspond to network 111, cloud infrastructure system 120, data platform 150, and storage system 115 of FIG. 1A. Although only one storage system 115 is depicted, data platform 150 may apply techniques in accordance with this disclosure using multiple instances of storage system 115. The different instances of storage system 115 may be deployed by different cloud storage providers, the same cloud storage provider, by an enterprise, or by other entities.

Computing system 202 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 202 represents a cloud computing system, server farm, and/or server cluster (or portion thereof) that provides services to other devices or systems. In other examples, computing system 202 may represent or be implemented through one or more virtualized compute instances (e.g., virtual machines, containers) of a cloud computing system, server farm, data center, and/or server cluster.

Computing system 202 may include one or more communication units 215, one or more input devices 217, and one or more output devices 218. In the example of FIG. 2, computing system includes one or more storage devices of storage system 105. Storage system 105 includes interface module 226, file system manager 152, backup manager 154, policies 158, backup metadata 222, and chunk metadata 220. One or more of the devices, modules, storage areas, or other components of computing system 202 may be interconnected to enable inter-component communications (physically, communicatively, and/or operatively). In some examples, such connectivity may be provided through communication channels (e.g., communication channels 212), which may represent one or more of a system bus, a network connection, an inter-process communication data structure, or any other method for communicating data.

One or more processors 213 of computing system 202 may implement functionality and/or execute instructions associated with computing system 202 or associated with one or more modules illustrated in FIG. 2 and described below. One or more processors 213 may be, may be part of, and/or may include processing circuitry that performs operations in accordance with one or more aspects of the present disclosure. Examples of processors 213 include microprocessors, application processors, display controllers, auxiliary processors, one or more sensor hubs, and any other hardware configured to function as a processor, a processing unit, or a processing device. Computing system 202 may use one or more processors 213 to perform operations in accordance with one or more aspects of the present disclosure using software, hardware, firmware, or a mixture of hardware, software, and firmware residing in and/or executing at computing system 202.

One or more communication units 215 of computing system 202 may communicate with devices external to computing system 202 by transmitting and/or receiving data, and may operate, in some respects, as both an input device and an output device. In some examples, communication units 215 may communicate with other devices over a network. In other examples, communication units 215 may send and/or receive radio signals on a radio network such as a cellular radio network. In other examples, communication units 215 of computing system 202 may transmit and/or receive satellite signals on a satellite network. Examples of communication units 215 include a network interface card (e.g., such as an Ethernet card), an optical transceiver, a radio frequency transceiver, a GPS receiver, or any other type of device that can send and/or receive information. Other examples of communication units 215 may include devices capable of communicating over Bluetooth®, GPS, NFC, ZigBee®, gRPC, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth®, NFC, or other technologies or protocols.

One or more input devices 217 may represent any input devices of computing system 202 not otherwise separately described herein. Input devices 217 may generate, receive, and/or process input. For example, one or more input devices 217 may generate or receive input from a network, a user input device, or any other type of device for detecting input from a human or machine.

One or more output devices 218 may represent any output devices of computing system 202 not otherwise separately described herein. Output devices 218 may generate, present, and/or process output. For example, one or more output devices 218 may generate, present, and/or process output in any form. Output devices 218 may include one or more USB interfaces, video and/or audio output interfaces, or any other type of device capable of generating tactile, audio, visual, video, electrical, or other output. Some devices may serve as both input and output devices. For example, a communication device may both send and receive data to and from other systems or devices over a network.

One or more storage devices of local storage system 105 within computing system 202 may store information for processing during operation of computing system 202, such as random access memory (RAM), Flash memory, solid-state disks (SSDs), hard disk drives (HDDs), etc. . . . Storage devices may store program instructions and/or data associated with one or more of the modules described in accordance with one or more aspects of this disclosure. One or more processors 213 and one or more storage devices may provide an operating environment or platform for such modules, which may be implemented as software, but may in some examples include any combination of hardware, firmware, and software. One or more processors 213 may execute instructions and one or more storage devices of storage system 105 may store instructions and/or data of one or more modules. The combination of processors 213 and local storage system 105 may retrieve, store, and/or execute the instructions and/or data of one or more applications, modules, or software. Processors 213 and/or storage devices of local storage system 105 may also be operably coupled to one or more other software and/or hardware components, including, but not limited to, one or more of the components of computing system 202 and/or one or more devices or systems illustrated as being connected to computing system 202.

File system manager 152 may perform functions relating to providing file system 153, as described above with respect to FIG. 1A. File system manager 152 may generate and manage file system metadata 232 for structuring file system data 230 for file system 153, and store file system metadata 232 and file system data 230 to local storage system 105. File system metadata 232 may include one or more trees that describe objects within file system 153 and the file system 153 hierarchy, and can be used to write or retrieve objects within file system 153. File system metadata 232 may reference any of chunk metadata 220 or backup metadata 222, and vice-versa. File system manager 152 may interact with and/or operate in conjunction with one or more modules of computing system 202, including interface module 226 and backup manager 154.

Backup manager 154 may perform backup functions relating to backing up (e.g., creating backups 142) of objects 122 of cloud infrastructure system 120, as described above with respect to FIG. 1A. Backup manager 154 may generate one or more backups 142 and cause objects 122 to be stored as chunks 164 within chunkfiles 162 in storage system 115. Backup manager 154 may apply an adaptive deduplication process to selectively deduplicate chunks of objects within objects 122, in accordance with one or more policies 158. Backup manager 154 may generate and manage backup metadata 222 for generating, viewing, retrieving, or restoring any of backups 142. Backup metadata 222 may include respective original data lock periods for backups 142. Backup manager 154 may generate and manage chunk metadata 220 for generating, viewing, retrieving, or restoring objects 122 stored as chunks 164 (and references thereto) within chunkfiles 162, for any of backups 142. Stored objects 122 may be represented and manipulated using logical files for identifying chunks for the objects. Chunk metadata 220 may include a chunk table that describes chunks 164. The chunk table may include respective chunk IDs for chunks 164 and may contain pointers to chunkfiles 162 and offsets within chunkfiles 162 for retrieving chunks 164 from storage system 115. Chunks 164 are written into chunkfiles 162 at different offsets. By comparing new chunk IDs to the chunk table, backup manager 154 can determine if the data already exists on the system. If the chunks already exist, data can be discarded and metadata for an object 122 may be updated to reference the existing chunk. Backup manager 154 may use the chunk table to look up the chunkfile identifier for the chunkfile that contains a chunk.

Chunk metadata 220 may include a chunkfile table that describes respective physical or virtual locations of chunkfiles 162 on storage system 115, along with other metadata about the chunkfile, such as a checksum, encryption data, compression data, etc. In FIG. 2A, backup manager 154 causes backup metadata 222 and chunk metadata 220 to be stored to local storage system 105. In some examples, backup manager 154 causes some or all of backup metadata 222 and chunk metadata 220 to be stored to storage system 115. Backup manager 152, optionally in conjunction with file system manager 152, may use backup metadata 222, chunk metadata 220, and/or file system metadata 232 to restore any of backups 142 to a file system implemented by data platform 150, which may be presented by file system manager 152 to other systems.

Interface module 226 may execute an interface by which other systems or devices may determine operations of file system manager 152 or backup manager 154. Another system or device may communicate via an interface of interface module 226 to specify one or more policies 158.

Interface module 240 of storage system 115 may execute an interface by which other systems or devices may create, modify, delete, or extend a WORM lock expiration time for any of chunkfiles 162. Interface module 240 may execute and present an API. The interface presented by interface module 240 may be a gRPC, HTTP, RESTful, command-line, graphical user, web, or other interface. Interface module 240 may be associated with use costs. One more methods or functions of the interface module 240 may impose a cost per-use (e.g., $0.10 to extend a WORM lock expiration time of chunkfiles 162).

Adapter 175 may receive input, such as request parameters, from storage system 105 or storage node 180, and generate a request from such input formatted according to an API or other interface of cloud infrastructure system 120. As such, adapter 175 may be an interface or translator between storage system 105 and an interface (e.g., API) of cloud infrastructure system 120. Adapter 175 may send requests to throttle client 176. Throttle client 176 may relay the request (e.g., request information) to throttle unit 156 such as described above. For example, throttle client 176 may send request information to throttle unit 156 through communication unit 215. In some examples, adapter 175 may instantiate (e.g., create) throttle client 176 to send request information to throttle unit 156, such as through throttle server 155.

Storage system 105 includes throttle server 155 and one or more throttle units 156. Throttle server 155 may manage zero or more throttle units 156, such as throttle units 156 residing on the same storage node 180 as throttle server 155. Throttle server 155 may be an endpoint for communication with throttle clients 176. For example, throttle server 155 may provide the gRPC or other interface via communication unit 215 to communicate with throttle clients 176, such as to receive request information from throttle clients 176. Data platform 150 may elect or select one throttle server 155 to be a master throttle server 155 that may maintain context information 159, such as a storage system 105.

Throttle units 156 may make (e.g., send) and throttle (e.g., refrain from sending for at least a period of time) requests to cloud infrastructure system 120. Throttle units 156 may send requests to and receive responses from cloud infrastructure system 120 through communication unit 215 in some examples. Throttle unit 156 may determine whether to send or refrain from sending a request (e.g., throttle) based on context information (e.g., state information) that throttle server 155 may maintain as described above.

System 200 of FIG. 2 may be modified to implement an example of system 180 of FIG. 1B. In the modified system 200, chunkfiles 162 may be stored to a local archive storage system 115 to support backups 142.

Figure 3:
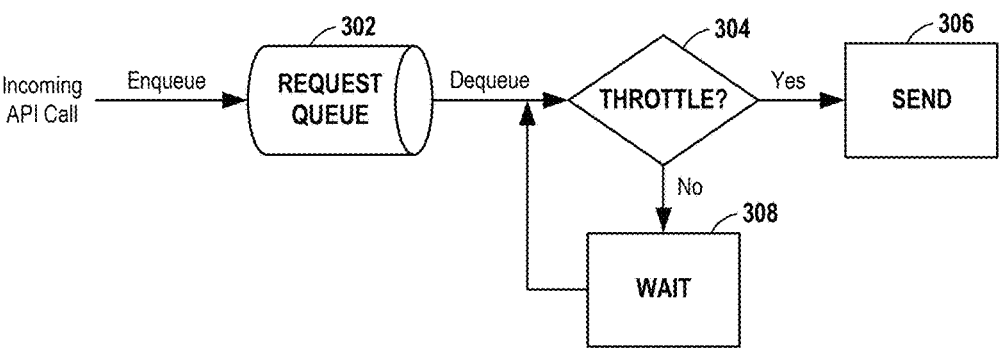
FIG. 3 is a flow chart illustrating an example mode of operation for a throttle unit to perform adaptive throttling based on rate-limiting signals from cloud infrastructure, in accordance with techniques of this disclosure.

FIG. 3 is a flow chart illustrating an example mode of operation for a throttle unit to perform adaptive throttling based on rate-limiting signals from cloud infrastructure, in accordance with techniques of this disclosure. One or more aspects of FIG. 3 may be described herein within the context of FIGS. 1A-1B. In some examples, throttle unit 156 may queue (e.g., store) requests (302) in a queue. A queue may be a portion of storage or memory of storage node 180 that stores requests for throttle unit 156. Throttle unit 156 may determine whether to send or throttle a request based on context information 159 (304), such as described above. Responsive to determining to send a request, throttle unit 156 may dequeue the request from the queue and send the request to cloud infrastructure system 120 (306). In some examples, throttle unit 156 may dequeue requests by removing individual requests from the queue on a first in first out (FIFO) or other sequence. Responsive to determining to refrain from sending the request (e.g., throttle), throttle unit 156 may wait for at least a delay period (e.g., 1 ms) (308). After the delay period has elapsed, throttle unit 156 may, in some cases, retry the request after the delay period, such as shown in FIG. 3.

Figure 4:
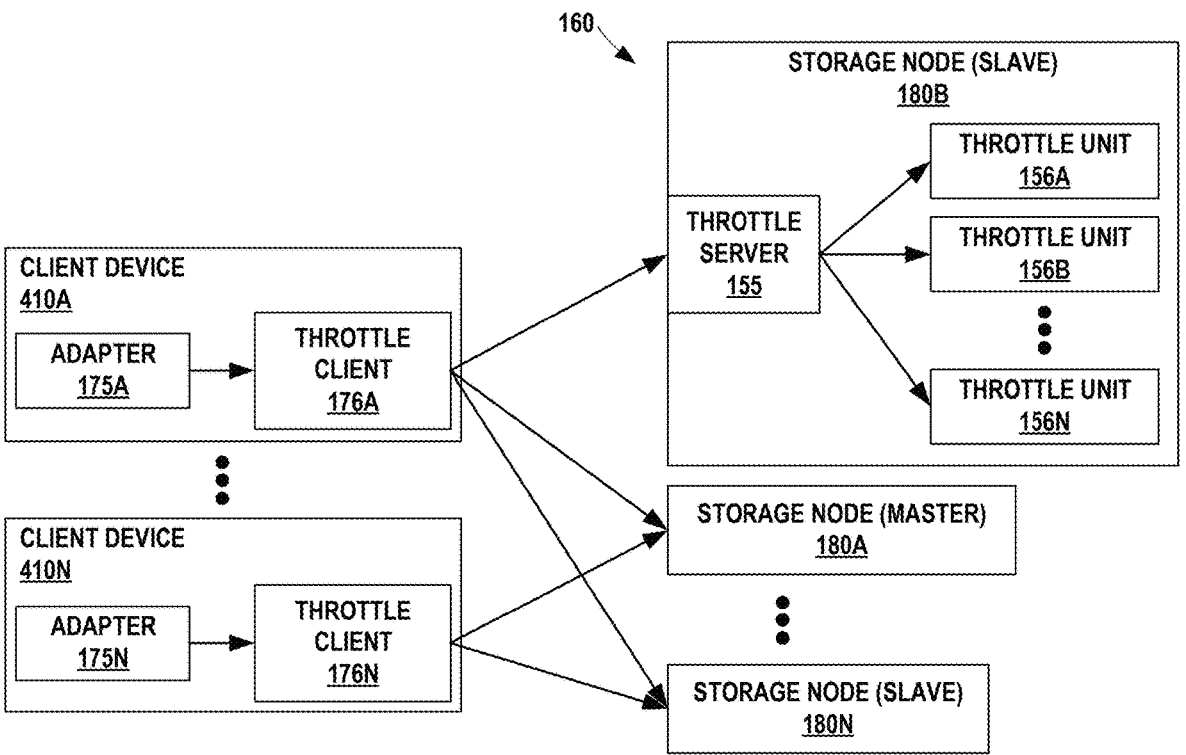
FIG. 4 is a block diagram illustrating example systems that perform adaptive throttling based on rate-limiting signals from cloud infrastructure, in accordance with techniques of this disclosure.

FIG. 4 is a block diagram illustrating example systems that perform adaptive throttling based on rate-limiting signals from cloud infrastructure, in accordance with techniques of this disclosure. FIG. 4 illustrates an example topology for such systems. One or more aspects of FIG. 4 may be described herein within the context of FIGS. 1A-1B. As can be seen, storage system 105 may comprise a plurality of storage nodes 180. Storage nodes 180 may comprise a master storage node 180A and one or more slave storage nodes 180B-180N. Though not shown, each slave storage node 180B-180N may include throttle server 155 and one or more throttle units 156. As described above, master storage node 180A may maintain context information 159 and perform management of slave storage nodes 180B-180N, such as by instantiating and/or deploying throttle server 155 and throttle units 156 to slave storage nodes 180B-180N.

One or more client devices 410 may make requests to cloud infrastructure system 120 through storage system 105. Application server 170, storage node 180, and other devices, such as mobile device 108 or user device 109 of FIG. 1A, may be examples of client devices 410. Client device 410 may include adapter 176 and throttle client 176 to make requests through storage system 105.

For example, client device 410 may send request information including a service identifier, through throttle client 176, to a particular throttle unit 156 and such throttle unit 156 may send a request, including the request information, to cloud infrastructure system 120. As can be seen, throttle client 176 may select from a plurality of storage nodes 180 and throttle units 155. For example, throttle client 176 may select throttle unit 155B of throttle units 155 at storage node 180B for a particular request, such as based on a load or other characteristics of each throttle unit 155 assigned to the service identifier. For instance, throttle unit 155B may have a lower load (e.g., lower CurrentConcurrency or CurrentRate) relative to other throttle units 155 and throttle client 176 may select throttle unit 155B for such reason. Throttle client 176 may access the context information to locate a selected throttle unit 155. For example, to locate throttle unit 155B, throttle client 176 may access context information 159, such as mapping information therein, and determine that throttle unit 155B resides on (e.g., is executed by) storage node 180B. Throttle client 176 may send the request information from client device 410 to throttle server 155 of storage node 180B. Throttle server 155 may route (e.g., send) the request information to throttle unit 156B based on a throttle unit identifier (e.g., ThrottleUnitId) in the request information. Throttle unit 156B may queue the request information and determine to send or throttle a request including the request information based on context information 159.

Figure 5:
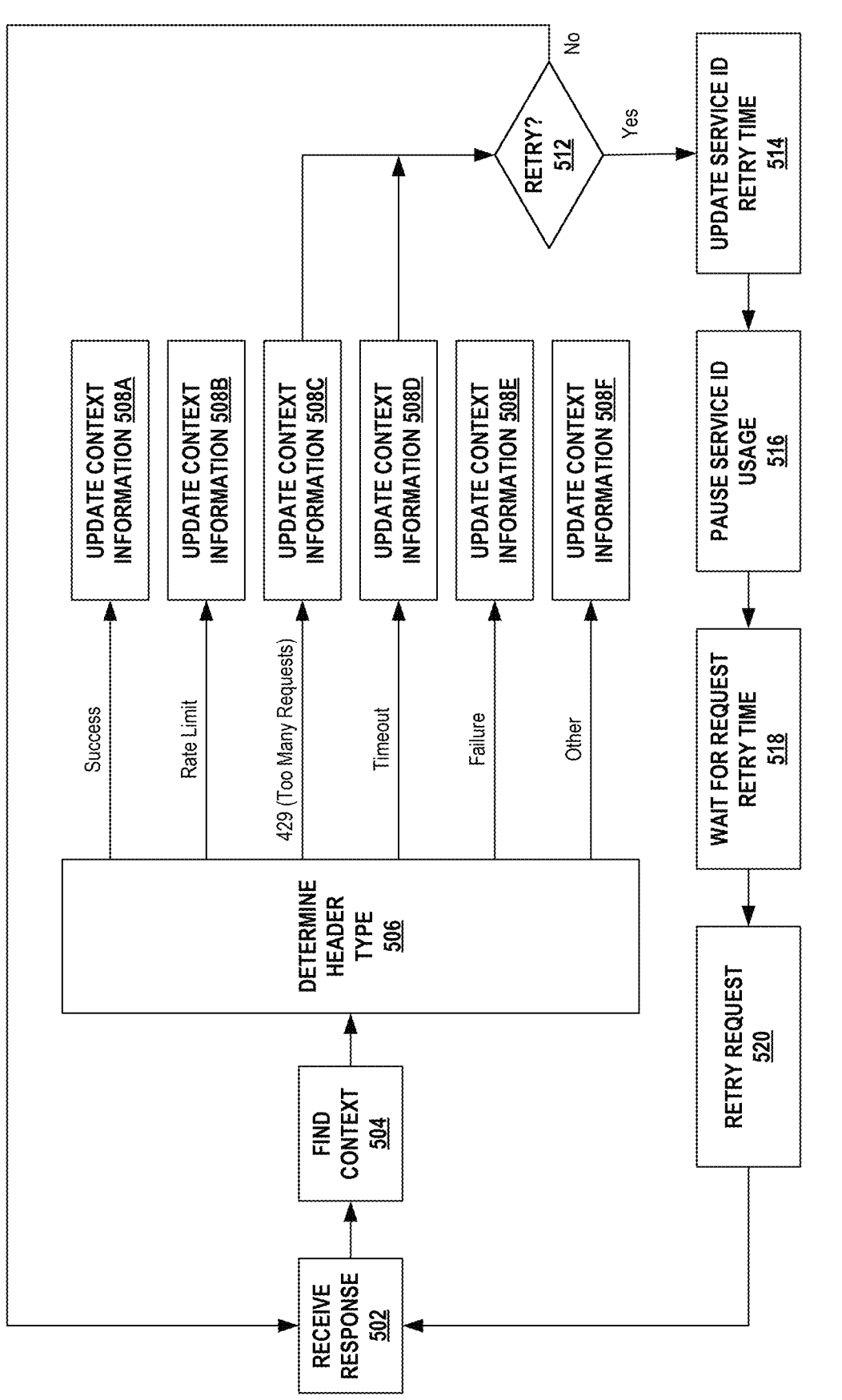
FIG. 5 is a flowchart illustrating an example mode of operation for a data platform to perform adaptive throttling based on rate-limiting signals from cloud infrastructure, in accordance with techniques of this disclosure.

FIG. 5 is a flowchart illustrating an example mode of operation for a data platform to perform adaptive throttling based on rate-limiting signals from cloud infrastructure, in accordance with techniques of this disclosure. One or more aspects of FIG. 5 may be described herein within the context of FIGS. 1A-1B. After sending a request including a service identifier to cloud infrastructure system 120, throttle unit 156 may receive a response to the request (502). Throttle server 155 may find at least a portion of context information 159 related to the response (504). For example, throttle server 155 may retrieve the portion of context information 159 stored along with a service identifier matching the service identifier of the request. Throttle server 155 may retrieve context information 159 from storage system 105 in some examples. Throttle server 155 may determine a type for the response, such as based on a header of the response (506). Based on the type of response, storage node 180 may retry or not retry the request.

Throttle server 155 (e.g., the master throttle server 155) may update context information 159, such as to reflect the receipt of the response (508A-508F). For example, throttle server 155 may decrement CurrentConcurrency and/or CurrentRate in context information 159 to reflect receipt of the response. Throttle server 155 may also update context information 159 to include any rate-limiting signals in the response. For example, throttle server 155 may update the context information to include rate-limiting information from RateLimit headers (508B), 429 headers (508C), and timeout headers (508D), that may be present in the response.

Throttle unit 156 may retry requests when particular response headers are received. For example, requests that cause response headers, such as 429 headers and timeout headers, may be retried in some cases. Throttle unit 156 may determine whether or not to retry such request based on context information 159 (512). For example, throttle unit 156 may determine to retry when a delay period (e.g., a Retry-After or NextCallTimestamp) indicates a time in the future (e.g., is non-zero), MaxRetryCount/MaxRetryTime have not been exceeded, or both.

When a request is to be retried, throttle server 155 (e.g., the master throttle server) may update a retry time for the service identifier of the request in context information 159 (514). For example, throttle server may update a delay period (e.g., Retry-After or NextCallTimestamp) in context information 159. Throttle units 156, such as throttle units 156 assigned to the service identifier, may receive the updated retry time by accessing context information 159 and pause (e.g., throttle) requests based on context information 159 (516). For example, throttle units 156 may throttle requests in response to a delay period in context information 159 indicating a future time. Throttle unit 156 may wait for the delay period to elapse (518) before retrying the request (520). Other throttle units 156, such as other throttle units 156 assigned to the service identifier, may also wait for the delay period to elapse before sending more requests.

FIG. 6 is a flowchart illustrating an example mode of operation for a data platform to perform adaptive throttling based on rate-limiting signals from cloud infrastructure, in accordance with techniques of this disclosure. One or more aspects of FIG. 6 may be described herein within the context of FIGS. 1A-1B. Data platform 150, implemented by a plurality of nodes 180, may receive a service identifier from a cloud infrastructure system 120 (602). As described above, the service identifier may be included in requests from data platform 150 to cloud infrastructure system 120 to authenticate the requests at cloud infrastructure system 120.

A first node 180A may receive a rate-limiting signal from the cloud infrastructure system (604). For example, first node 180A may receive a rate-limiting signal in response to a request from first node 180A. Data platform 150 may update context information associated with the service identifier based on the rate-limiting signal (606). The rate-limiting signal may be different signals, such as an overload signal, a rate-limit signal, or a timeout signal for example.

Data platform 150 may perform different operations based on a type or characteristic of the rate-limiting signal. For example, when the rate-limiting signal is a rate limit signal, data platform 150 may determine an amount of resource consumption by comparing metrics for one or more outstanding requests to a request limitation of cloud infrastructure system 120. In such case, updating the context information associated with the service identifier may include data platform 150 updating the context information based on the amount of resource consumption. The request limitation may be a limitation of the cloud infrastructure system, such as a maximum number of concurrent requests including the service identifier or a maximum rate of requests including the service identifier.

In some examples, the rate-limiting signal may be an overload signal. In such case, updating the context information associated with the service identifier may include data platform 150 updating the context information to cause first node 180A to determine to throttle the request for at least the delay period. In some examples, the rate-limiting signal may be a timeout signal. In such case, first node 180A may retry, after the delay period, the request a particular number of times or for some predetermined period of time.

A second node 180N may send, based on the service identifier, a request for the cloud infrastructure system to the first node (608). In some examples, data platform 150 may route the request from second node 180N to first node 180A based on the service identifier. For instance, data platform 150 may route the request from second node 180N to first node 180A based on a mapping, which may be stored in the context information, of the service identifier to throttle unit 156A of first node 180A. First node 180A may throttle the request for the cloud infrastructure system based on the context information at least for a delay period (610). First node 180A may, after the delay period, send the request to the cloud infrastructure system 120. In some examples, first node 180A may store the request in a queue. In such case, throttling the request may include first node 180A refraining from sending the request, and maintaining the request in the queue. In response to throttling the request, data platform 150 may set the delay period to lower a rate of sending requests at first node 180A.

Data platform 150 may throttle requests in various ways. For example, data platform 150 may receive a rate-limiting signal from cloud infrastructure system 120. Data platform 150 may update context information associated with the service identifier based on the rate-limiting signal. Data platform 150 may determine, based on the context information, whether to send a request or to refrain from sending the request. Data platform 150 may determine a delay period based on the context information and refrain from sending the request at least for the delay period.

Data platform 150 may perform different operations based on a type or characteristic of the rate-limiting signal. For example, when the rate-limiting signal is a rate limit signal, data platform 150 may determine an amount of resource consumption by comparing metrics for one or more outstanding requests to a request limitation of cloud infrastructure system 120. In such case, updating the context information associated with the service identifier may include data platform 150 updating the context information based on the amount of resource consumption. The request limitation may be a limitation of the cloud infrastructure system, such as a maximum number of concurrent requests including the service identifier or a maximum rate of requests including the service identifier. In some examples, the rate-limiting signal may be an overload signal. In such case, updating the context information associated with the service identifier may include data platform 150 updating the context information to cause first node 180A to determine to throttle the request for at least the delay period. In some examples, the rate-limiting signal may be a timeout signal. In such case, first node 180A may retry, after the delay period, the request a particular number of times or for some predetermined period of time.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

The detailed description set forth herein, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

In accordance with one or more aspects of this disclosure, the term "or" may be interrupted as "and/or" where context does not dictate otherwise. Additionally, while phrases such as "one or more" or "at least one" or the like may have been used in some instances but not others; those instances where such language was not used may be interpreted to have such a meaning implied where context does not dictate otherwise.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

The invention claimed is:

1. A method comprising:
   receiving, by a data platform implemented by a plurality of nodes, a service identifier from a cloud infrastructure system;
   receiving, by a first node of the plurality of nodes, a rate-limiting signal from the cloud infrastructure system;
   updating, by the data platform, context information associated with the service identifier based on the rate-limiting signal;

sending, by a second node of the plurality of nodes and based on the service identifier, a request for the cloud infrastructure system to the first node; and
   throttling, by the first node, the request for the cloud infrastructure system based on the context information at least for a delay period.

2. The method of claim 1, further comprising sending, by the first node and after the delay period, the request for the cloud infrastructure system to the cloud infrastructure system.

3. The method of claim 1, further comprising routing, by the data platform, the request for the cloud infrastructure system from the second node to the first node based on the context information.

4. The method of claim 1, wherein the rate-limiting signal is a signal selected from the group consisting of an overload signal, a rate-limit signal, and a timeout signal.

5. The method of claim 4, wherein the rate-limiting signal is the rate limit signal, the method further comprising:
   determining, by the data platform, an amount of resource consumption by comparing metrics for one or more outstanding requests to a request limitation of the cloud infrastructure system;
   wherein updating the context information associated with the service identifier comprises updating, by the data platform, the context information based on the amount of resource consumption.

6. The method of claim 5, wherein the request limitation is a limitation of the cloud infrastructure system selected from the group consisting of a maximum number of concurrent requests including the service identifier and a maximum rate of requests including the service identifier.

7. The method of claim 4, wherein the rate-limiting signal is the overload signal and updating the context information associated with the service identifier based on the rate-limiting signal comprises updating, by the data platform, the context information to cause the first node to determine to throttle the request for the cloud infrastructure system for at least the delay period.

8. The method of claim 4, wherein the rate-limiting signal is the timeout signal, the method further comprising retrying, by the first node and after the delay period, the request a particular number of times or for some predetermined period of time.

9. The method of claim 1, further comprising responsive to throttling the request for the cloud infrastructure system, setting, by the data platform, the delay period to lower a rate of sending requests at the first node.

10. A computing system comprising:
   a memory storing instructions; and
   processing circuitry configured to execute the instructions to:
      receive, by a data platform implemented by a plurality of nodes, a service identifier from a cloud infrastructure system;
      receive, by a first node of the plurality of nodes, a rate-limiting signal from the cloud infrastructure system;
      update, by the data platform, context information associated with the service identifier based on the rate-limiting signal;
      send, by a second node of the plurality of nodes and based on the service identifier, a request for the cloud infrastructure system to the first node; and
      throttle, by the first node, the request for the cloud infrastructure system based on the context information at least for a delay period.

11. The computing system of claim 10, wherein the rate-limiting signal is a signal selected from the group consisting of an overload signal, a rate-limit signal, and a timeout signal.

12. The computing system of claim 10, wherein the rate-limiting signal is the rate limit signal and the processing circuitry is configured to execute the instructions to:

determine an amount of resource consumption by comparing metrics for one or more outstanding requests to a request limitation of the cloud infrastructure system;

wherein to update the context information associated with the service identifier the processing circuitry is configured to execute the instructions to update the context information based on the amount of resource consumption.

13. The computing system of claim 10, wherein the rate-limiting signal is an overload signal and to update the context information associated with the service identifier based on the rate-limiting signal the processing circuitry is configured to execute the instructions to update the context information to cause the first node to throttle the request for the cloud infrastructure system for at least the delay period.

14. The computing system of claim 10, wherein the rate-limiting signal is a timeout signal and the processing circuitry is configured to execute the instructions to retry, by the first node and after the delay period, the request for the cloud infrastructure system a particular number of times or for some predetermined period of time.

15. The computing system of claim 10, wherein the rate-limiting signal is a rate limit signal, wherein the processing circuitry is configured to execute the instructions to determine an amount of resource consumption by comparing metrics for one or more outstanding requests to a request limitation of the cloud infrastructure system, and wherein the processing circuitry is configured to execute the instructions to update the context information based on the amount of resource consumption.

16. The computing system of claim 15, wherein the request limitation is a limitation of the cloud infrastructure system selected from the group consisting of a maximum number of concurrent requests including the service identifier and a maximum rate of requests including the service identifier.

17. The computing system of claim 10, wherein the rate-limiting signal is an overload signal, and wherein the processing circuitry is configured to execute the instructions to update the context information to cause the first node to determine to throttle the request for the cloud infrastructure system for at least the delay period.

18. The computing system of claim 10, wherein the rate-limiting signal is a timeout signal, and wherein the processing circuitry is configured to execute the instructions to further retry, by the first node and after the delay period, the request a particular number of times or for some predetermined period of time.

19. The computing system of claim 10, wherein the processing circuitry is configured to execute the instruction to, responsive to throttling the request for the cloud infrastructure system, set, by the data platform, the delay period to lower a rate of sending requests at the first node.

20. Non-transitory computer-readable media storing instructions that, when executed, cause one or more processors of a plurality of nodes to:

receive, by a data platform implemented by the plurality of nodes, a service identifier from a cloud infrastructure system;

receive, by a first node of the plurality of nodes, a rate-limiting signal from the cloud infrastructure system;

update, by the data platform, context information associated with the service identifier based on the rate-limiting signal;

send, by a second node of the plurality of nodes and based on the service identifier, a request for the cloud infrastructure system to the first node; and throttle, by the first node, the request for the cloud infrastructure system based on the context information at least for a delay period.

* * * * *